United States Patent [19]

Koguchi et al.

[11] Patent Number: 5,689,385
[45] Date of Patent: Nov. 18, 1997

[54] RECORDING AND/OR REPRODUCING APPARATUS HAVING TAPE TRAVEL DIRECTION CONTROL ARRANGEMENT WHICH PREVENTS TAPE SLIPPAGE AND SLACK GENERATION

[75] Inventors: Toshinari Koguchi, Saitama-ken; Toshiyuki Yamazaki; Mitsunori Matsumura, both of Tokyo, all of Japan

[73] Assignee: Sony Corporation, Japan

[21] Appl. No.: 468,142

[22] Filed: Jun. 6, 1995

Related U.S. Application Data

[62] Division of Ser. No. 122,184, Sep. 17, 1993, Pat. No. 5,438,466, which is a continuation of Ser. No. 495,988, Mar. 20, 1990, abandoned.

[30] Foreign Application Priority Data

| Mar. 31, 1989 | [JP] | Japan | 1-80466 |
| Apr. 18, 1989 | [JP] | Japan | 1-96352 |
| Apr. 26, 1989 | [JP] | Japan | 1-106439 |

[51] Int. Cl.⁶ .................................................. G11B 15/43
[52] U.S. Cl. ................... 360/96.1; 360/74.3; 242/333.3; 242/334
[58] Field of Search ............... 360/85, 95, 96.1–96.6, 360/74.1, 74.3; 242/333, 349, 356, 333.3, 333.4, 334, 334.1–334.6

[56] References Cited

U.S. PATENT DOCUMENTS

| 4,149,202 | 4/1979 | Terada et al. | 360/96.3 |
| 4,279,006 | 7/1981 | Sasaki et al. | 360/74.1 |
| 4,328,520 | 5/1982 | Iwata et al. | 360/96.3 |
| 4,495,535 | 1/1985 | Kohri et al. | 360/96.3 |
| 4,547,823 | 10/1985 | Ri et al. | 360/96.3 |
| 4,564,873 | 1/1986 | Hashimoto et al. | 360/96.3 |
| 4,642,712 | 2/1987 | Kohda | 360/85 |
| 4,723,184 | 2/1988 | Takai et al. | 360/96.3 |
| 4,734,800 | 3/1988 | Suzuki | 360/85 |
| 4,752,845 | 6/1988 | Suzuki | 360/85 |
| 4,814,912 | 3/1989 | Kleinlein et al. | 360/96.3 |
| 4,819,891 | 4/1989 | Kamijo | 360/96.4 |
| 4,853,804 | 8/1989 | Suwa et al. | 360/85 |
| 4,922,357 | 5/1990 | Komatsu et al. | 360/96.3 |
| 4,930,720 | 6/1990 | Hwang | 360/96.5 |
| 4,936,524 | 6/1990 | Hüutter | 360/96.3 |
| 4,956,731 | 9/1990 | Yoshimura | 360/96.3 |
| 4,964,589 | 10/1990 | Okada | 360/96.3 |
| 5,070,422 | 12/1991 | Sasaki et al. | 360/96.3 |
| 5,086,359 | 2/1992 | Tsuchiya | 360/96.3 |

FOREIGN PATENT DOCUMENTS

| 0087952 | 9/1983 | European Pat. Off. . |
| 0297805 | 1/1989 | European Pat. Off. . |
| 1-267865 | 10/1989 | Japan . |
| 810674 | 3/1959 | United Kingdom . |
| 2185616 | 7/1987 | United Kingdom . |

*Primary Examiner*—Craig A. Renner
*Attorney, Agent, or Firm*—Ronald P. Kananen

[57] ABSTRACT

A system for providing stable tape-travel in a recording and/or reproducing apparatus includes a tape travel-direction switching mechanism and a tape tension regulating mechanism. The tape travel-direction switching mechanism forces a pendulum gear to engage one of a supply or take-up reel table when the traveling direction of tape is switched between forward and reverse directions while a capstan motor is turned off and a pinch roller presses the tape against the capstan so as to prevent the occurrence of slack in the tape. The tape tension regulating mechanism takes up the slack in the tape before a capstan axle causes the tape to travel in the reverse direction, so as to prevent the tape from being loosened when the traveling direction of the tape is switched from the forward direction to the reverse direction.

7 Claims, 22 Drawing Sheets

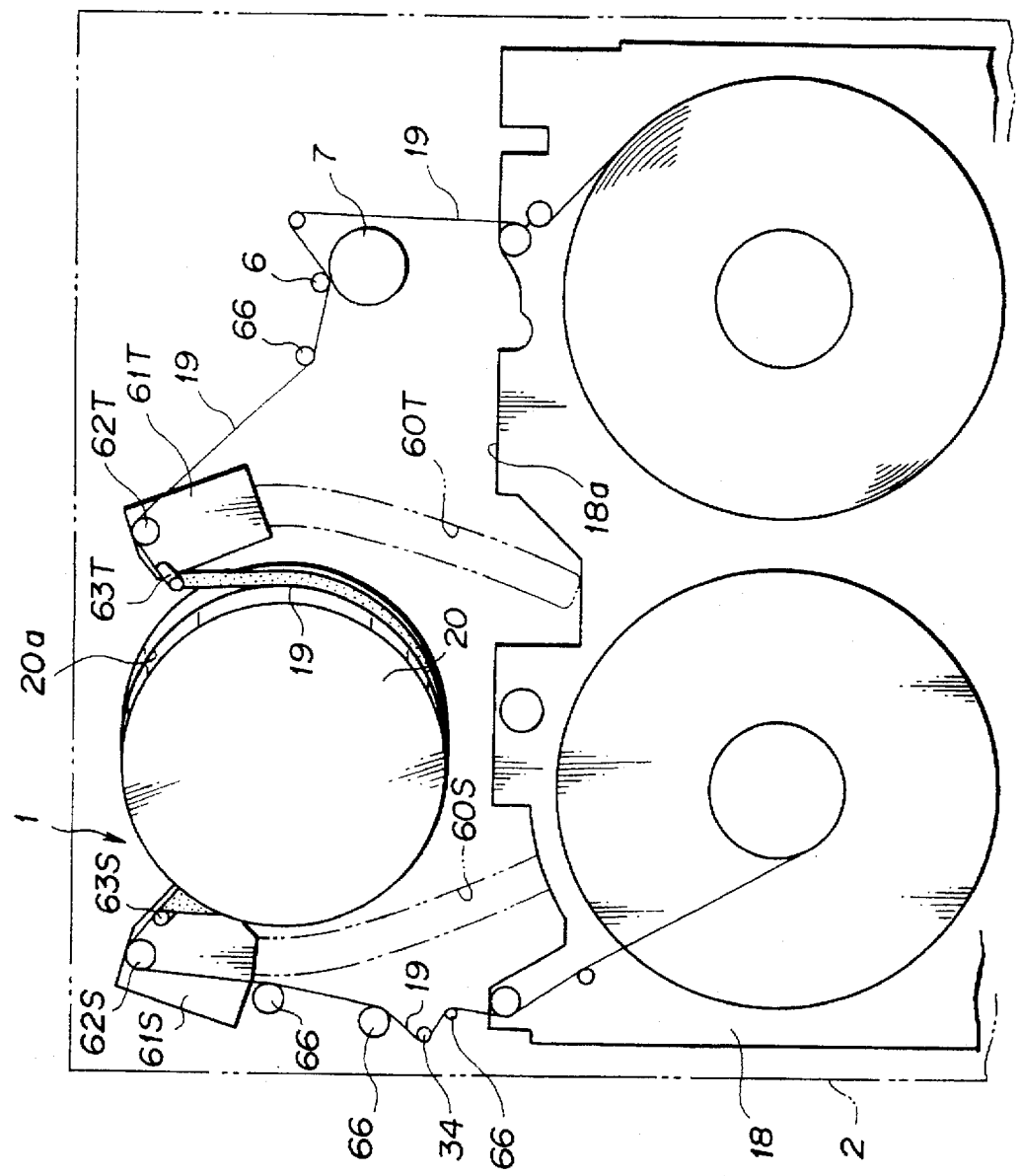

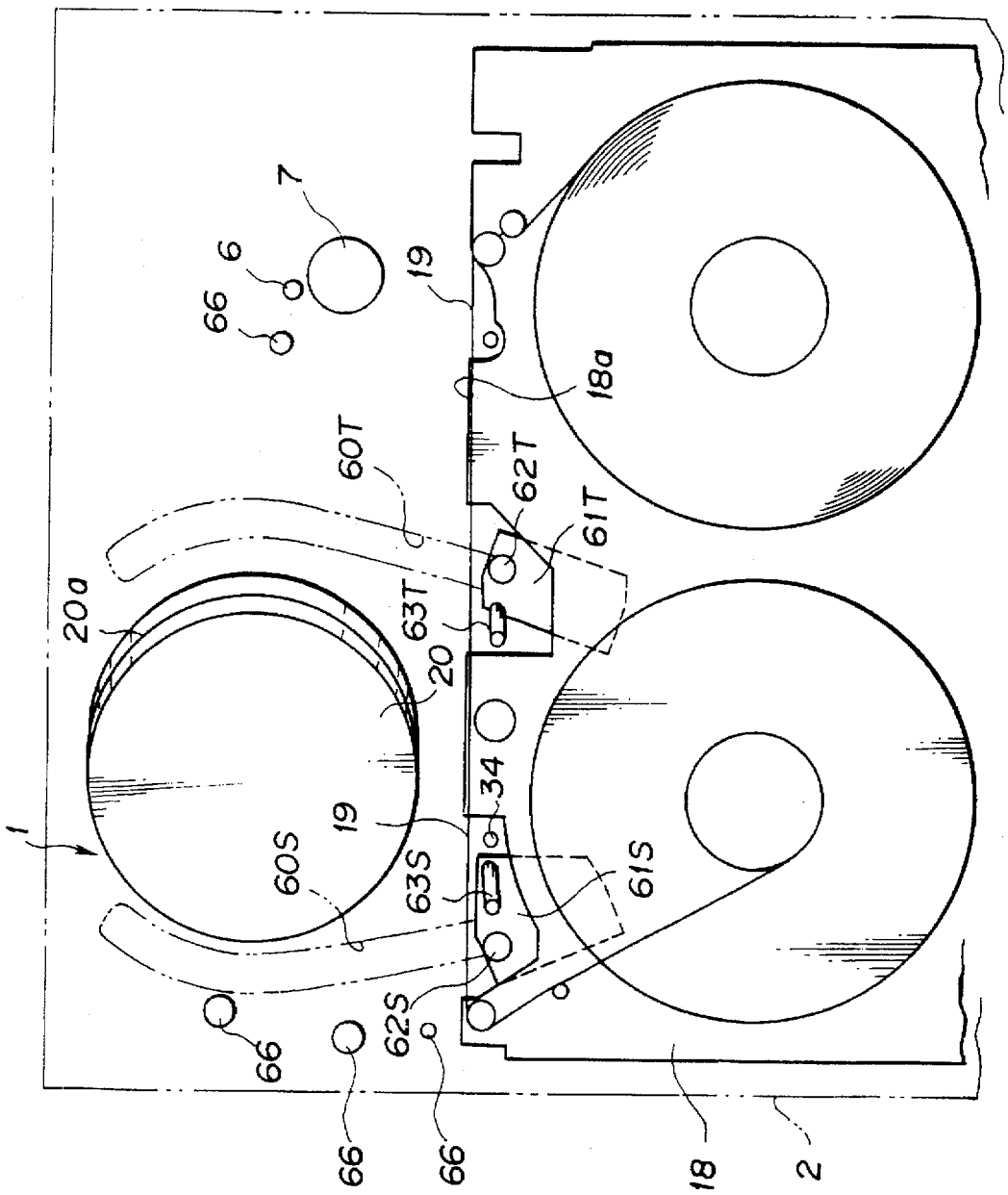

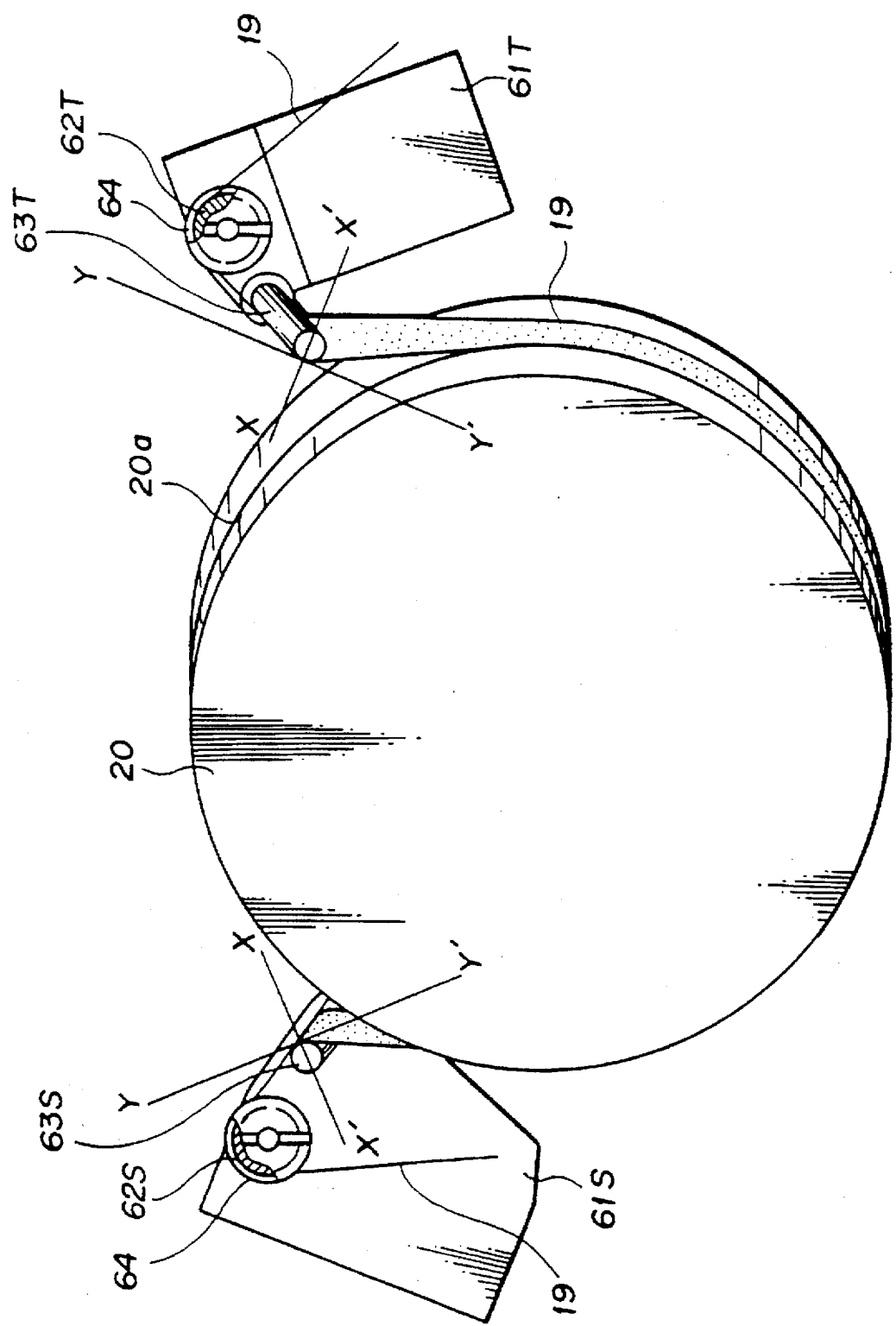

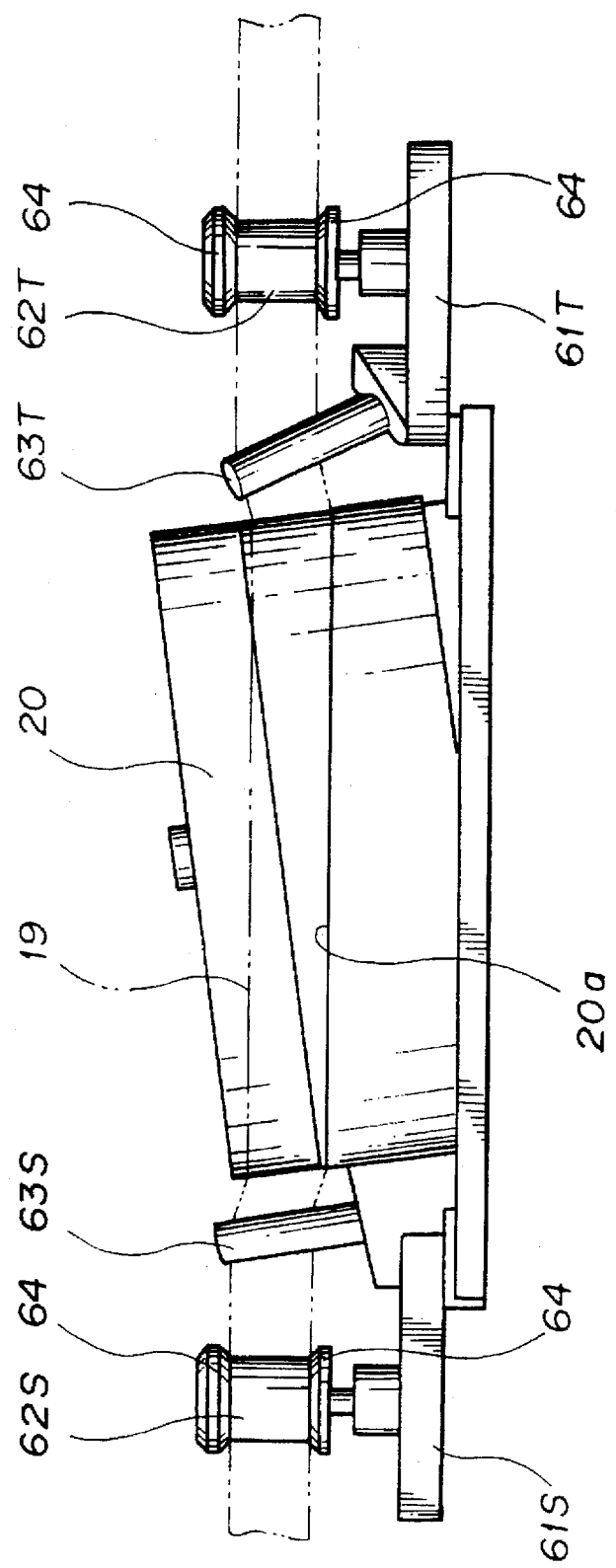

RECORDING AND/OR REPRODUCING APPARATUS HAVING TAPE TRAVEL DIRECTION CONTROL ARRANGEMENT WHICH PREVENTS TAPE SLIPPAGE AND SLACK GENERATION

This application is a division of application Ser. No. 08/122,184 filed Sep. 17, 1993, now U.S. Pat. No. 5,438,466, issued Aug. 1, 1995, which is a continuation of 07/495,988 filed Mar. 20, 1990, now abandoned.

BACKGROUND OF THE INVENTION

1. Field of the Invention

The present invention relates generally to a system for providing stable tape-travel in recording and/or reproducing apparatus, such as video tape recorders (VTR). More specifically, the invention relates to a system which can prevent the occurrence of slack in tape which travels in a recording and/or reproducing apparatus when the tape traveling direction is switched between forward and reverse.

2. Description of the Prior Art

In recent years, some recording and/or reproducing apparatus, such as video tape recorders, use a common motor which drives a capstan axle as well as two reel tables in order to make the apparatus more compact.

In such recording and/or reproducing apparatus, the motor causes the capstan axle to rotate clockwise or counterclockwise for causing magnetic tape to travel along a tape traveling path in a forward or reverse direction. The magnetic tape is urged toward the capstan axle by means of a pinch roller so as to travel depending upon the rotation of the capstan axle. The motor also causes two reel tables, i.e. a supply reel table and a take-up reel table to selectively rotate clockwise or counterclockwise via a pendulum gear which is movable between the supply and take-up reel tables. The pendulum gear is engageable with respective reel tables via idler gears. With this construction, for example, in order to cause the magnetic tape to travel in the forward direction, the capstan motor rotates counterclockwise, so that the magnetic tape is fed toward the take-up reel table depending upon the rotation of the capstan axle. At this time, the pendulum gear engages the take-up reel table via an idler gear so that the take-up reel table rotates clockwise for winding magnetic tape thereon. On the other hand, in order to cause the magnetic tape to travel in the rearward direction, the capstan motor rotates clockwise, so that the magnetic tape is fed toward the supply reel table depending upon the rotation of the capstan axle. At this time, the pendulum gear engages the supply reel table via its idler gear so that the supply reel table rotates counterclockwise for winding the magnetic tape thereon.

On the other hand, in recent years, some video tape recorders have a so-called JOG/SHUTTLE function which may suitably perform reproduction in forward or reverse directions at a slow-speed, a usual-speed or a high-speed. In such video tape recorders, for example, when the operation mode is switched from a forward reproduction mode in which the magnetic tape travels in the forward direction while the reproduction of picture signals is performed, to a reverse reproduction mode in which the magnetic tape travels in the reverse direction while the reproduction of picture signals is performed, there is a disadvantage in that tape drop-out, jitter, picture noise and so forth are produced at the switching time.

That is, when the operation mode is switched from the forward reproduction mode to the reverse reproduction mode, the supply and take-up reel tables do not rotate to take up the magnetic tape thereon while the pendulum gear is moving between the reel tables, although the capstan axle continues to rotate, feeding magnetic tape toward the supply reel table. As a result, slack in the tape traveling path is produced, so that the magnetic tape can not suitably come into proper contact with a rotary head drum thus, tape drop-out, jitter, picture noise and so forth are caused.

In order to prevent the aforementioned disadvantage, the tape may be prevented from being fed by releasing the pinch roller from contact with the capstan axle while the pendulum gear is moving between the supply and take-up reel tables. However, when the tape pinch roller is released from tight contact against the capstan axle, the position of the magnetic tape tends to shift relative to the rotary head drum. In addition, switching operations between forward and reverse reproduction modes cannot be rapidly performed. Therefore, the above solution cannot be used for video tape recorders having a JOG/SHUTTLE function.

In addition, in recent years, some video tape recorders have a tape tension regulating mechanism which applies a constant tension to the magnetic tape for maintaining suitable contact conditions between the magnetic tape and the rotary head drum. Such conventional tension regulating mechanisms are designed to apply tension to the magnetic tape when the operation mode is the forward reproduction mode, and to release tension from being applied to the magnetic tape when the operation mode is switched from the forward reproduction mode to the reverse reproduction mode. As a result, when the operation mode is switched from forward to reverse, a disadvantage occurs in that slack in the tape traveling path is produced, so that the position of the magnetic tape may shift from a suitable position on the rotary head drum, causing occurrence of tape drop-out, jitter, picture noise and so forth.

SUMMARY OF THE INVENTION

It is therefore an object of the present invention to eliminate the aforementioned disadvantage and to provide a system for providing stable tape-travel in a recording and/or reproducing apparatus, such as a video tape recorder.

Another object of the invention is to provide a system which can prevent the occurrence of slack during tape travel in a recording and/or reproducing apparatus when the tape traveling direction is switched between forward and reverse directions.

Another object of the invention is to provide a system which can prevent the occurrence of tape drop-out, jitter, picture noise and so forth when the tape traveling direction is switched between forward and reverse directions.

Another object of the invention is to provide a system which can rapidly switch the operation mode of the recording and/or reproducing apparatus without occurring tape drop-out, jitter, picture noise and so forth.

A further object of the invention is to provide a system which can cause a tape to be wound onto a rotary head drum at a predetermined suitable angle in the recording and/or reproducing apparatus.

In order to accomplish the aforementioned and other objects, a system for providing stable tape-travel in a recording and/or reproducing apparatus, according to the present invention, may include a mechanism for switching the traveling direction of a tape which selectively travels in a forward or reverse direction in the recording and/or reproducing apparatus. The switching mechanism may include means for forcing a pendulum gear to engage a supply reel table when the traveling direction of the tape is switched from the forward direction to the reverse direction, and a take-up reel table when the traveling direction is switched from the reverse direction to the forward direction.

The system for providing stable tape-travel may also include a mechanism for regulating tension applied to a tape which selectively travels in a forward or reverse direction in the recording and/or reproducing apparatus. The tension regulating mechanism may include means for taking up slack in the tape so as to prevent the tape from being loosened when the traveling direction of the tape is switched from the forward direction to the reverse direction.

The system for providing stable tape-travel may further include a tape guiding mechanism for causing a tape to be wound onto a rotary head drum at a predetermined angle in the recording and/or reproducing apparatus. The tape guiding mechanism may include an inclined guide post which is arranged between the rotary head drum and a guide roller so as to incline at a predetermined angle offset from a theoretical angle in a direction parallel to the surface of tape as arranged on the side of the rotary head drum, the theoretical angle being derived from predetermined parameters including the inclined angle of the rotary head drum and a tape-wrap angle at which the tape is wound onto the rotary head drum.

According to one aspect of the present invention, the system for switching the traveling direction of a tape which selectively travels in a first or second direction in a recording and/or reproducing apparatus which has a first reel onto which the tape traveling in the first direction is wound, and a second reel onto which the tape traveling in the second direction is wound, comprises:

first means for causing the tape to selectively travel in the first or second direction;

first driving means for driving the first means in response to turning ON thereof;

second means, associated with the first means, for selectively engaging one of the first and second reels so that the tape is wound onto the engaged first or second reel;

third means for momentarily turning OFF said first driving means for a predetermined time period at a time when the traveling direction of said tape is switched between said first direction and said second direction;

fourth means for forcing the second means to engage the first reel when the traveling direction of the tape is switched from the second direction to the first direction, and to engage the second reel when the traveling direction of the tape is switched from first direction to the second direction; and second driving means for driving the third means.

The second means may include a gear which is rotatable by the first means, and is movable for engaging one of the first and second reels. The first means may include an axle which is caused to rotate by the first driving means, and a roller which is rotatable depending upon the rotation of the axle when the roller makes thrusting contact with the axle via the tape which travels in the first or second direction depending upon the rotating direction of the axle while the tape is tightly held between the axle and the roller. The fourth means may force the second means to engage one of the first and second reels while the tape is tightly held against the axle by means of the roller while the axle is stopped. The fourth means may include an elongated member which is so arranged as to extend in a direction essentially parallel to the moving direction of the gear, and is movable in the longitudinal direction thereof, the elongated member causing the rotation axis of the gear to move. The second driving means may cause the elongated member to move via a cam gear. The recording and/or reproducing apparatus may be selectively operable in a first reproduction mode in which reproduction is performed while the tape travels in the first direction, and in a second reproduction mode in which reproduction is performed while the tape travels in the second direction, and the third means may force the second means to engage the first or second reel when the operation made of the recording and/or reproducing apparatus is switched from the second reproduction mode to the first reproduction mode.

According to another aspect of the present invention, a system for switching the traveling direction of a tape which selectively travels in a forward or reverse direction in a recording and/or reproducing apparatus which has a take-up reel table onto which tape traveling in the forward direction is wound, and a supply reel table onto which tape traveling in the reverse direction is wound, the recording and/or reproducing apparatus being selectively operable in a forward reproduction mode in which reproduction is performed while the tape travels in the forward direction, and in a reverse reproduction mode in which reproduction is performed while the tape travels in the reverse direction, comprises:

a capstan axle which is rotatable;

a pinch roller which is rotatable depending upon the rotation of the capstan axle when the roller thrusts against the capstan axle, the pinch roller being cooperative with the capstan axle for causing the tape to travel in the forward or reverse direction while the tape is tightly pushed onto the capstan axle by means of the pinch roller;

first driving means for causing the capstan axle to rotate;

a pendulum gear which is rotatable depending upon the rotation of the capstan axle, and which is movable for engaging one of the take-up and supply reel tables so as to transmit the rotation force of the capstan axle to the engaged take-up or supply reel table;

switching means for forcing the pendulum gear to engage one of the take-up and supply reel tables when the operation mode of the recording and/or reproducing apparatus is switched between the forward and reverse reproduction modes while the pinch roller is thrust against the capstan axle while the capstan axle is stopped; and second driving means for driving the switching means.

The switching means may include an elongated member which is so arranged as to extend in a direction essentially parallel to the moving direction of the pendulum gear, and which is movable in the longitudinal direction thereof, the elongated member causing the rotation axis of the gear to move. The second driving means may cause the elongated member to move via a cam gear.

According to another aspect of the present invention, a system for regulating tension applied to a tape which selectively travels in a first or second direction in a recording and/or reproducing apparatus, comprises:

first means for causing the tape to selectively travel in the first or second direction;

second means for applying tension to tape which travels in the first direction, and for releasing the application of tension to tape which travels in the second direction;

third means for controlling the second means to regulate the tension applied to the tape which travels in the first direction; and fourth means, associated with the third means, for taking up any slack in the tape before the first means causes the tape to travel in the second direction, so as to prevent the tape from being loosened when the traveling direction of the tape is switched from the first direction to the second direction.

The recording and/or reproducing apparatus may have a first reel table onto which tape traveling in the first direction is wound, and a second reel table onto which tape traveling in the second direction is wound, the first and second reels being driven by the first means, and the fourth means causing the second reel table to rotate by a predetermined angle in a direction in which the tape is wound onto the second reel immediately before the first means causes the tape to travel in the second direction. The second reel may have a gear portion on the periphery thereof, and the fourth means may include a slidable member having a gear portion which is engageable with the gear portion of the second reel table, the slidable member being movable between first and second positions, the gear portion of the slidable member engaging the gear portion of the second reel table when the slidable member moves from the first position to the second position, and disengaging therefrom when it moves from the second position to the first position. The fourth means may include driving means for causing the slidable member to move between the first and second position. The slidable member may include a first plate member and a second plate member slidably supported on the first plate member, the gear portion of the slidable member being arranged on the second plate member, and the fourth means may include a cam gear having first and second cam grooves, and first and second arm members which respectively engage the first and second cam grooves so as to move at a predetermined timing, the first and second arm members being respectively engageable with the first and second plate members for causing the first and second member to move.

Preferably, the recording and/or reproducing apparatus is selectively operable in a first reproduction mode in which reproduction is performed while the tape travels in the first direction, and a second reproduction mode in which reproduction is performed while the tape travels in the second direction, the fourth means causing the second reel table to rotate in the direction in which the tape is wound onto the second reel table when the operation mode of the recording and/or reproducing apparatus is switched from the first reproduction mode to the second reproduction mode.

According to another aspect of the present invention, a system for regulating tension applied to a tape which selectively travels in a first or second direction in a recording and/or reproducing apparatus which has a first reel table onto which the tape traveling in the first direction is wound, and a second reel table onto which the tape traveling in the second direction is wound, comprises:

driving means for causing the tape to selectively travel in the first or second direction;

an arm member for applying tension to the tape traveling in the first direction, and for releasing the application of tension to the tape traveling in the second direction;

biasing means for biasing the arm member in a third direction essentially perpendicular to the first and second directions so as to cause the arm member to apply tension to the tape traveling in the first direction;

braking means for causing the arm member to move in a fourth direction which is opposite to the third direction, for regulating tension applied to tape traveling in the first direction depending upon the present tension of the tape; and thrusting means for forcing the second reel to rotate by a predetermined angle in a direction in which the tape is wound onto the second reel for taking up slack in the tape immediately before the driving means causes the tape to travel in the second direction, so as to prevent the tape from being loosened when the traveling direction of the tape is switched from the first direction to the second direction.

According to another aspect of the present invention, a tape guiding system for causing a tape to be wound onto a rotary head drum at a predetermined angle in a recording and/or reproducing apparatus, the rotary head drum being so arranged as to incline by a predetermined angle relative to a mechanical chassis of the recording and/or reproducing apparatus, comprises:

a guide roller which is so arranged as to extend essentially vertically relative to the mechanical chassis; and an inclined guide post which is arranged between the rotary head drum and the guide roller so as to incline at a predetermined angle offset from a theoretical angle in a direction parallel to the surface of tape as arranged on the side of the rotary head drum, the theoretical angle being derived from predetermined parameters including the inclined angle of the rotary head drum relative to the mechanical chassis and a tape-wrap angle at which the tape is wound onto the rotary head drum.

The distance t between the centers of the top end of an inclined guide post as inclined at the theoretical angle and the top end of the inclined guide post as inclined at the predetermined angle is subject to the following formula:

$$\sin(\alpha/2) = m/t$$

wherein $\alpha$ is the tape-wrap angle relative to the inclined guide post, and m is a constituent of the distance t in a direction perpendicular to a tangential line at the tape-wrap center of the inclined guide post as inclined at the theoretical angle. The guide roller may have two flanges which extend radially on the upper and lower ends so as to guide the tape between the flanges.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to a specific embodiment, but are for explanation and understanding only.

In the drawings:

FIG. 14 is a schematic plan view of a recording and/or reproducing apparatus, on which a tape guide mechanism is mounted, according to the present invention, which illustrates the state in which a magnetic tape is loaded on a rotary head drum;

FIG. 15 is a schematic plan view of the recording apparatus of FIG. 14, which illustrates the state in which the magnetic tape is not loaded on the rotary head drum;

FIG. 16 is an enlarged plan view of the main portion of the tape guide mechanism of FIG. 14;

FIG. 18 is a side view of the main portion of the tape guide mechanism of FIG. 14.

DESCRIPTION OF THE PREFERRED EMBODIMENT

A recording and/or reproducing apparatus, according to the present invention, will be described herebelow in terms of the preferred embodiments in order to facilitate a better understanding of the present invention. The recording and/or reproducing apparatus of the preferred embodiment is designed to record and reproduce a novel, recently proposed magnetic tape cassette specifically designed for PCM audio recording and/or reproduction. However, the present invention will be applicable not only to that specific PCM audio recording magnetic tape cassette but also any magnetic tape cassette which has the same or a similar cassette structure.

The recording and/or reproducing apparatus, according to the present invention, may selectively operate in forward and reverse reproduction modes. Throughout the disclosure, the forward and reverse reproduction modes respectively refer to modes in which the recording and/or reproducing apparatus may indicate an image on a television's picture plane by reading picture signals by means of a rotary head drum. In addition, the forward reproduction mode includes a normal-speed reproduction mode, a high-speed picture search mode, a slow-speed reproduction mode and so forth, and the reverse reproduction mode includes a normal-speed reverse reproduction mode, a high-speed reverse picture search mode, a slow-speed reverse reproduction mode and so forth.

Because of the rather complicated structure of the preferred embodiments the following disclosure will be made in terms of separate groups of components. Throughout the disclosure, the word "front", "rear", "right" and "left" used with respect to the recording and/or reproducing apparatus mean the bottom and top, and the right and left sides of FIG. 1.

Figure 1:
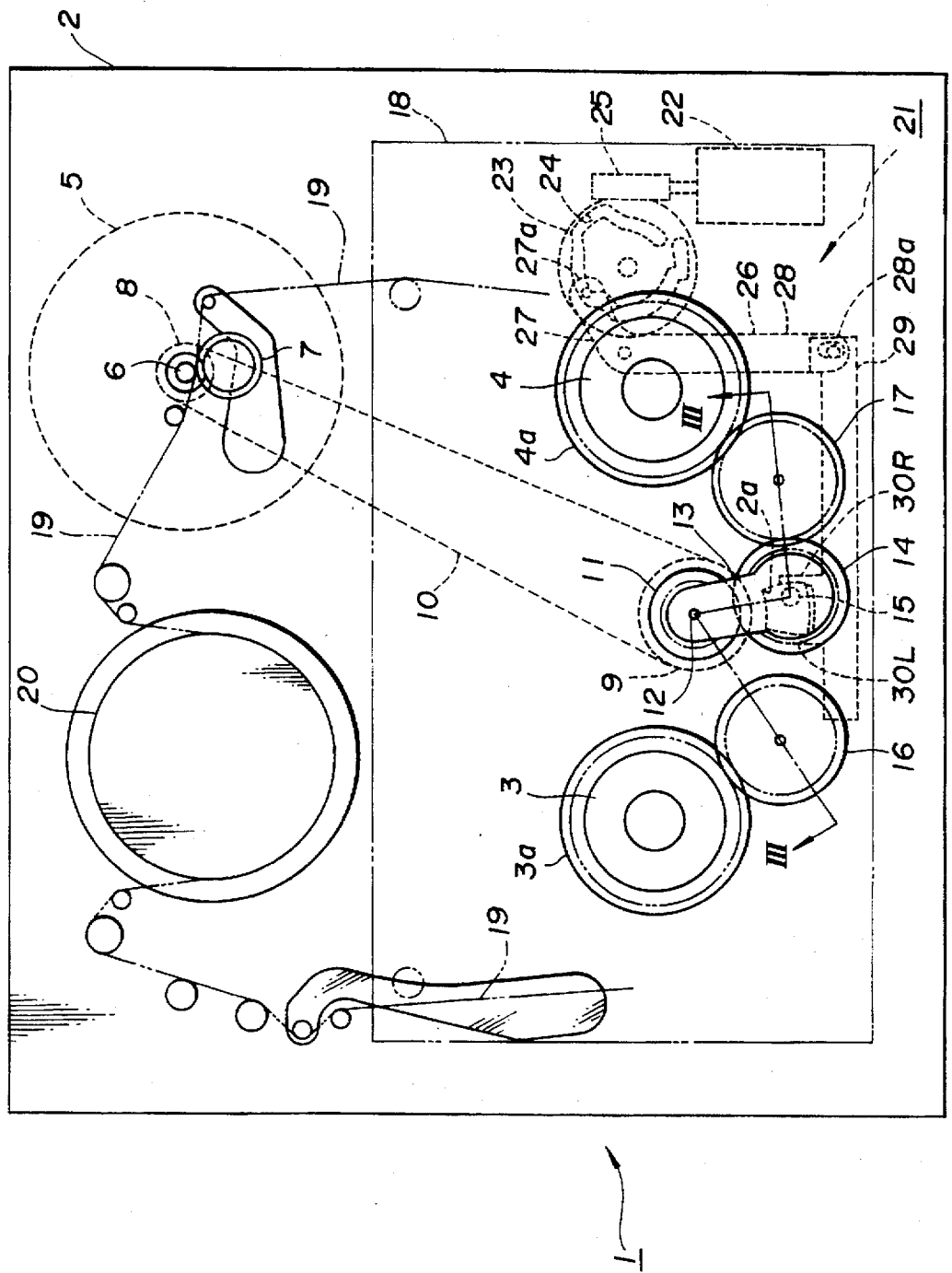
FIG. 1 is a schematic plan view of a recording and/or reproducing apparatus according to the present invention.
Figure 2:
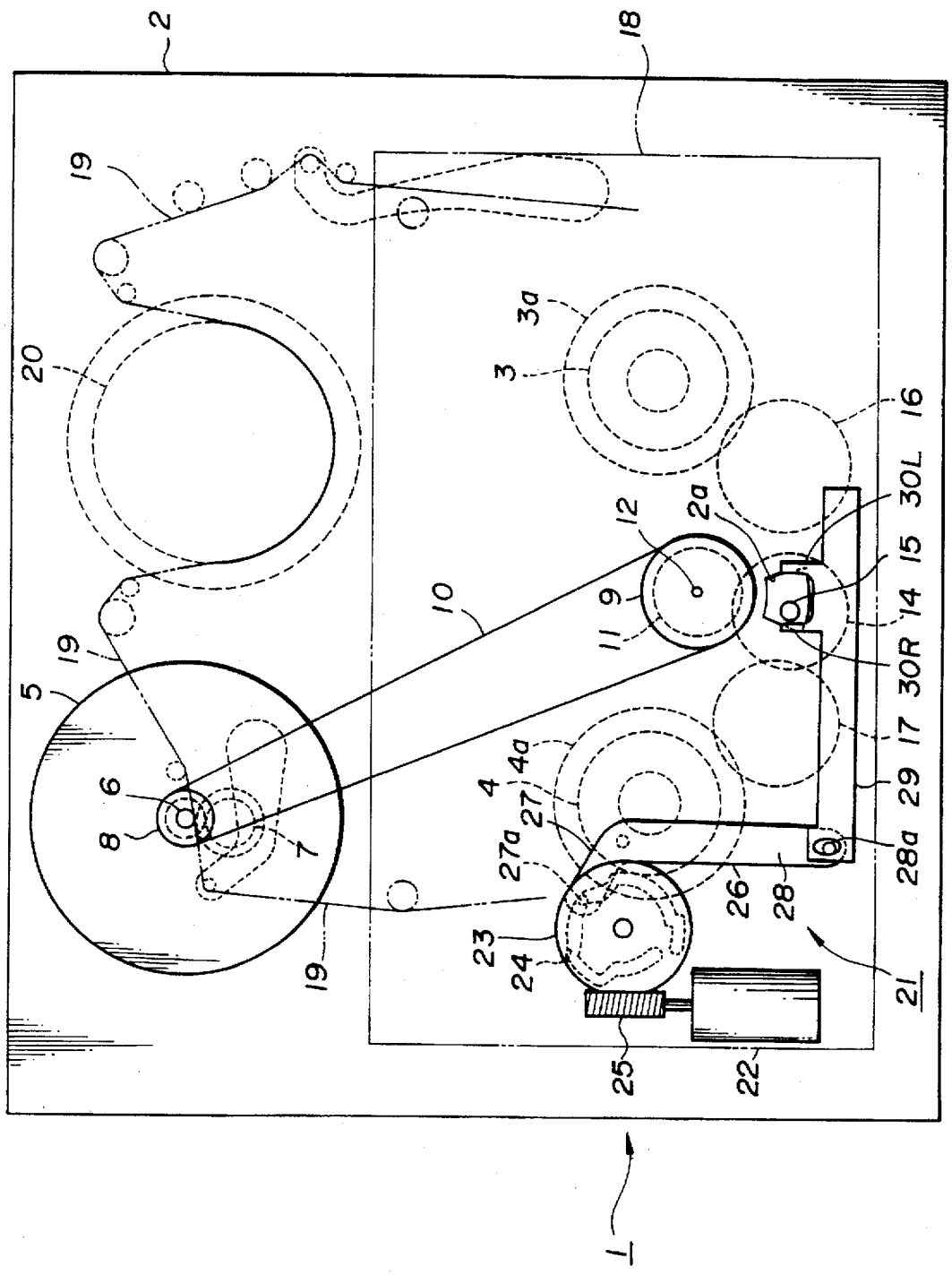
FIG. 2 is a bottom view of the recording and/or reproducing apparatus of FIG. 1.
Figure 3:
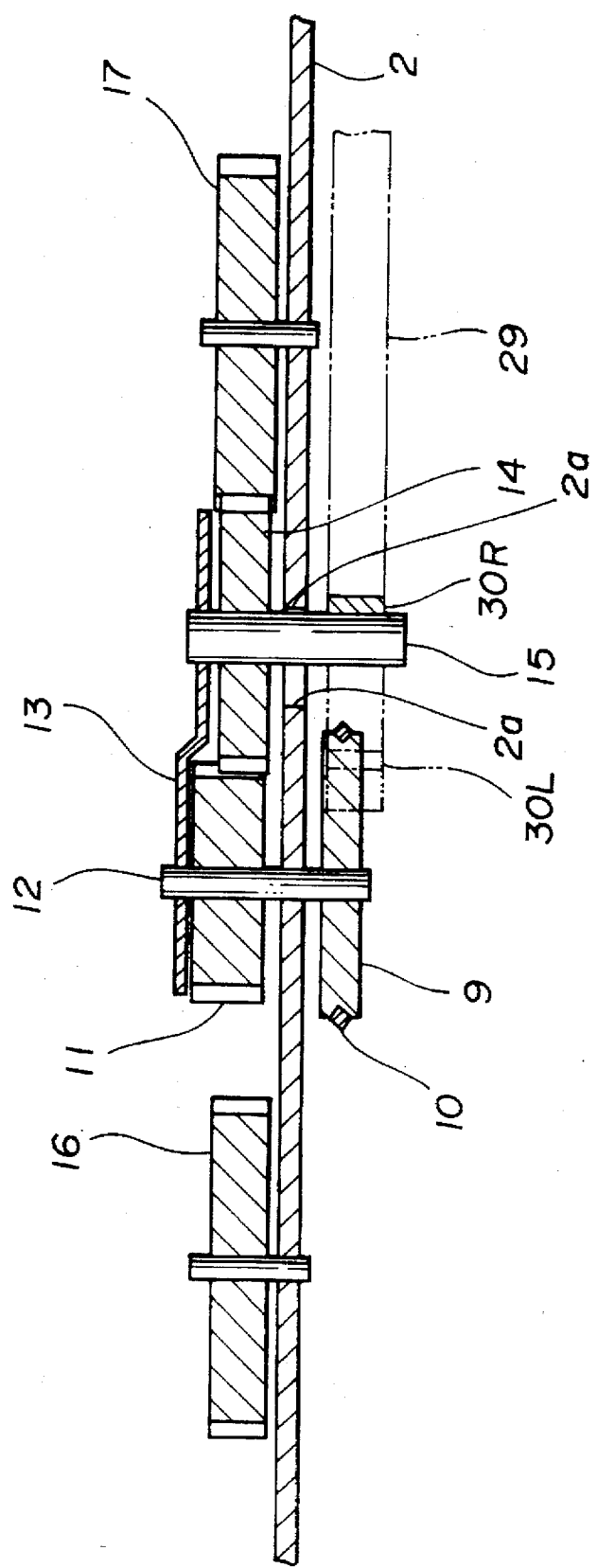
FIG. 3 is a sectional view of the recording and/or reproducing apparatus taken along the line III—III of FIG. 1.
Figure 4:
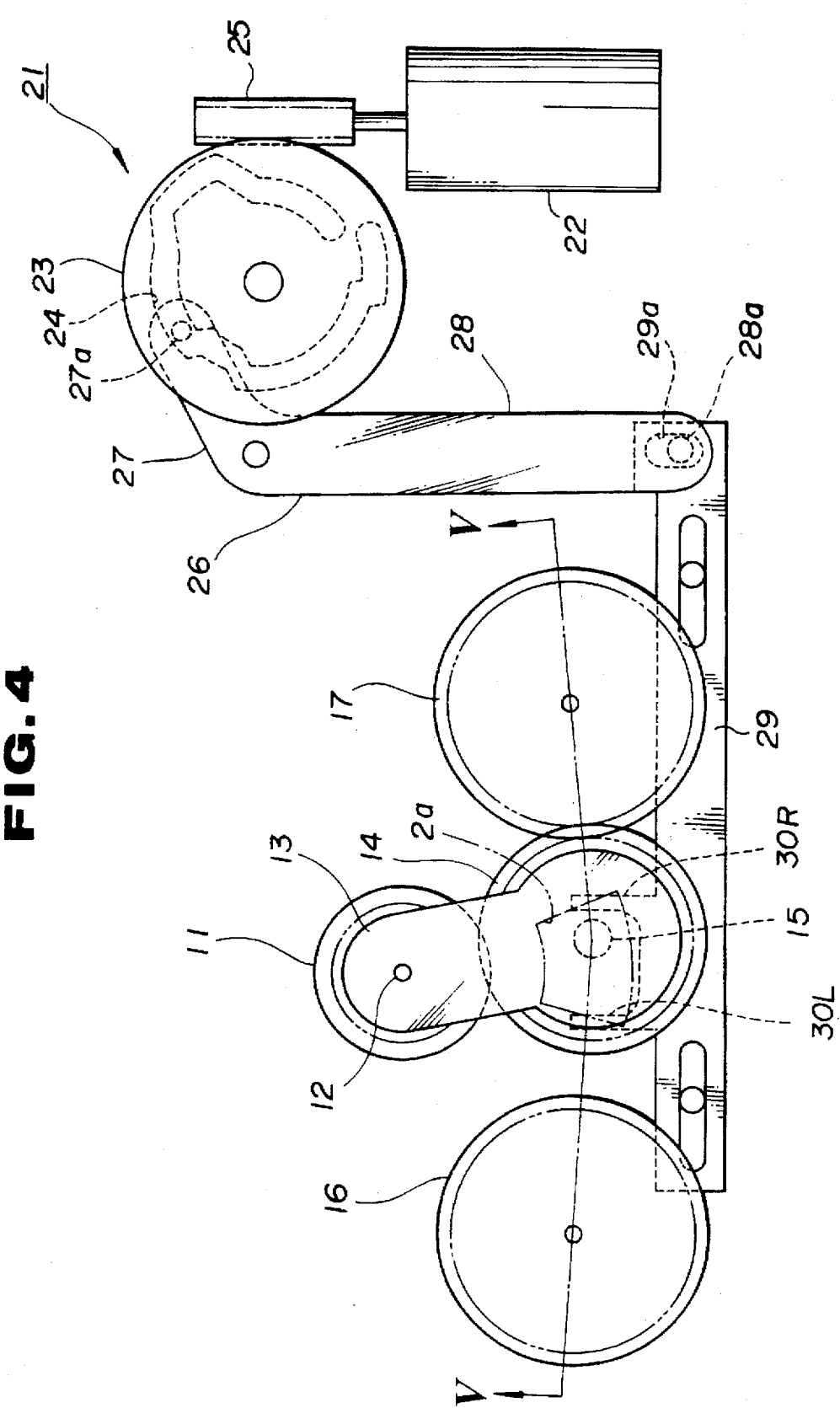
FIG. 4 is a plan view of the main portion of a switching mechanism for forcing a pendulum gear to oscillate as mounted on the recording and/or reproducing apparatus of FIG. 1, which illustrates the state of the switching mechanism when the recording and/or reproducing apparatus of FIG. 1 operates in the forward reproduction mode.
Figure 5:
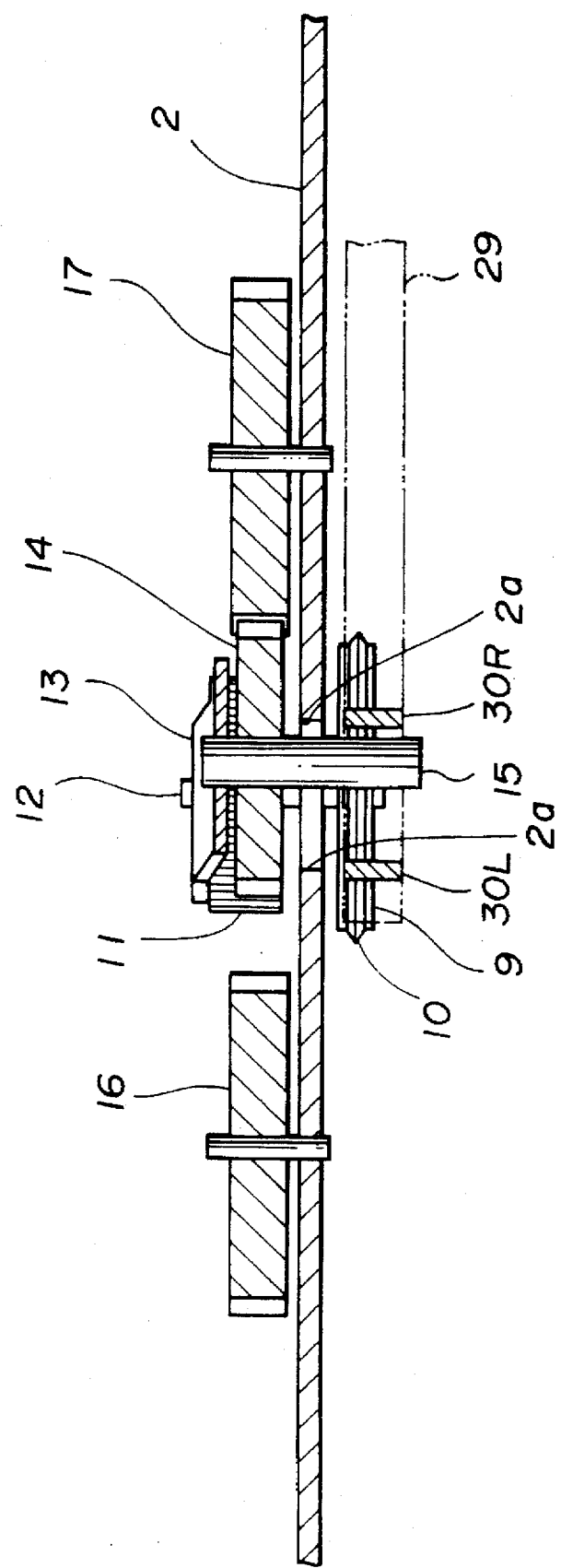
FIG. 5 is a sectional view of the main portion of the switching mechanism taken along the line V—V of FIG. 4.
Figure 6:
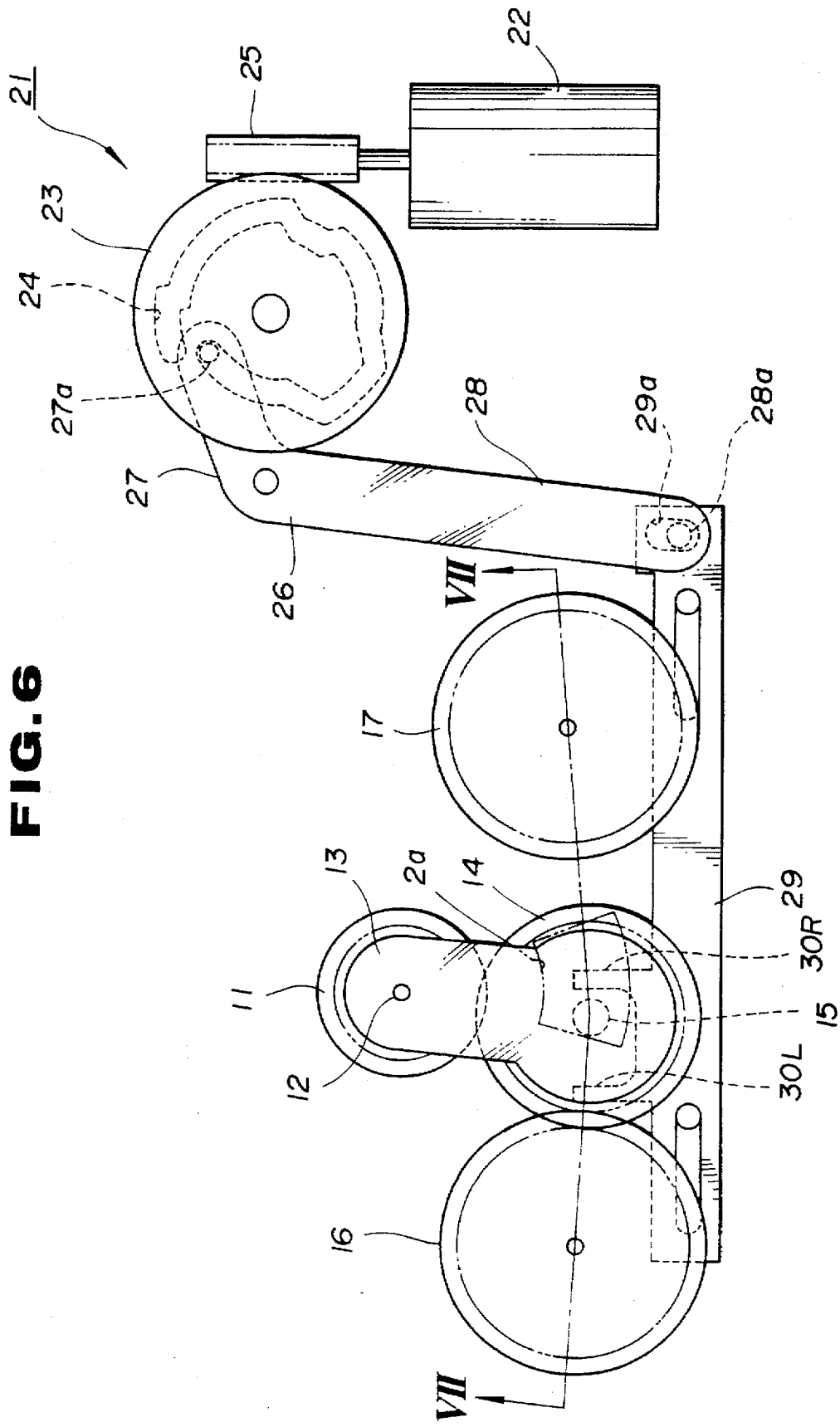
FIG. 6 is a plan view of the main portion of the switching mechanism of FIG. 4, which illustrates the state of the switching mechanism when the operation mode of the recording and/or reproducing apparatus of FIG. 1 is switched from the forward reproduction mode to the reverse reproduction mode.
Figure 7:
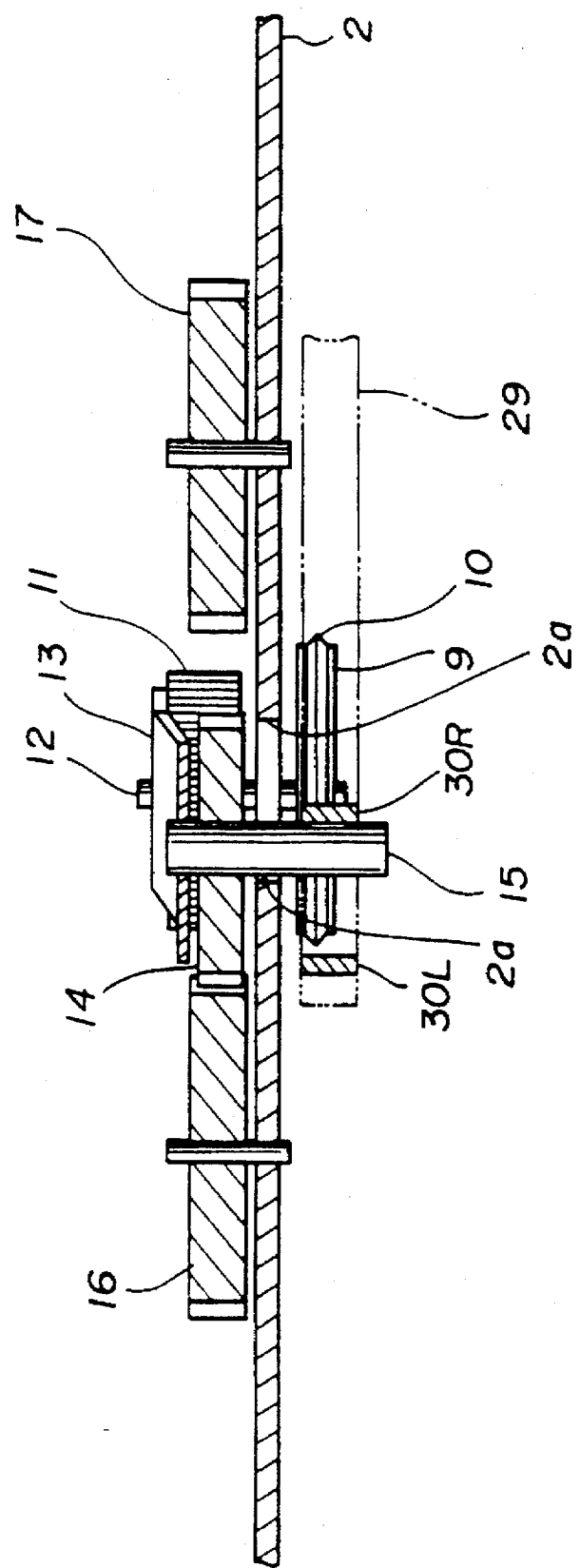
FIG. 7 is a sectional view of the main portion of the switching mechanism taken along the line VII—VII of FIG. 6.
Figure 8:
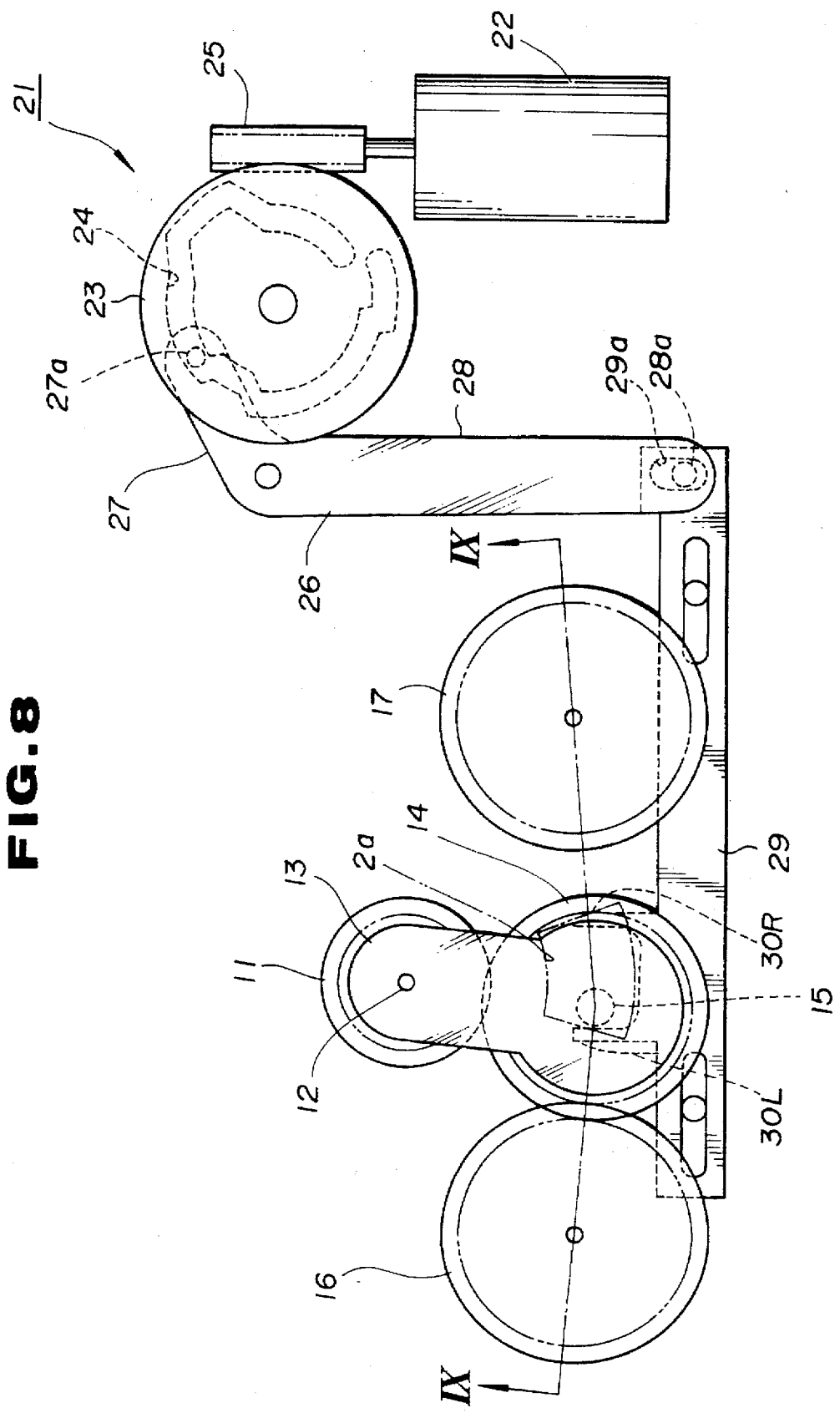
FIG. 8 is a plan view of the main portion of the switching mechanism of FIG. 4, which illustrates the state of the switching mechanism when the recording and/or reproducing apparatus of FIG. 1 operates in the reverse reproduction mode.
Figure 9:
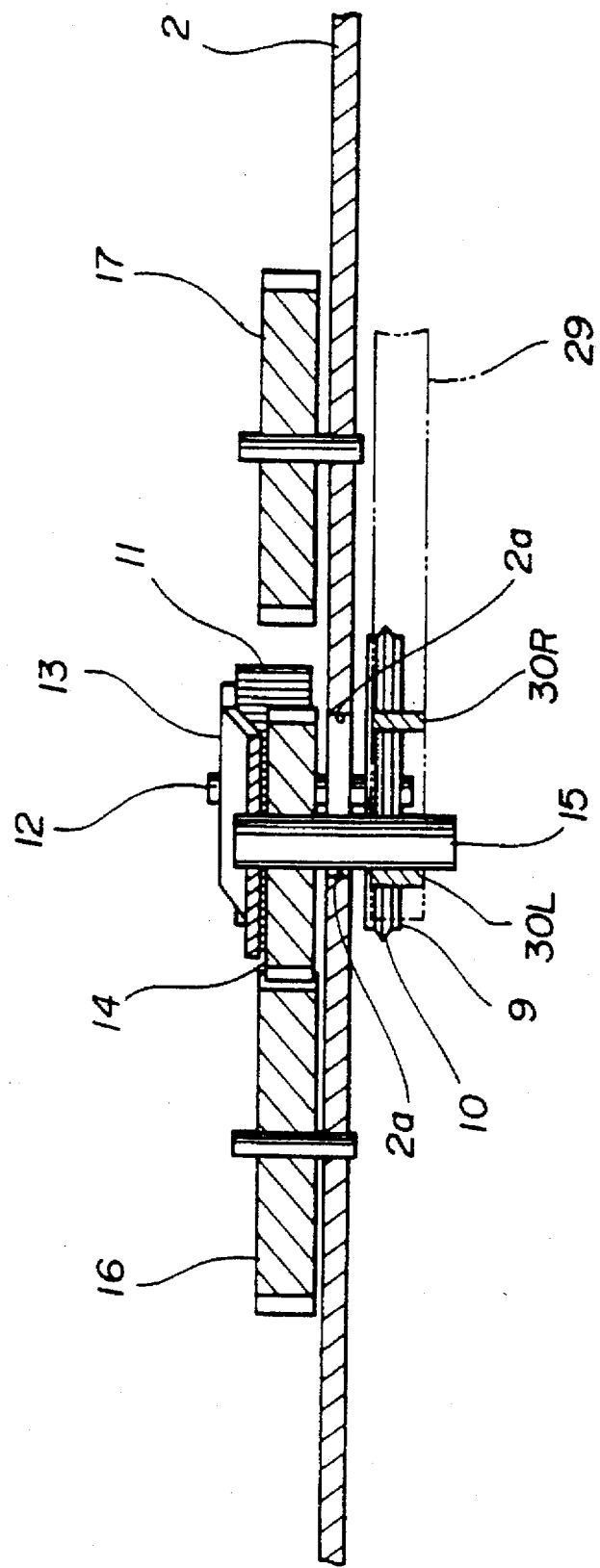
FIG. 9 is a sectional view of the main portion of the switching mechanism taken along the line IX—IX of FIG. 8.
Figure 10:
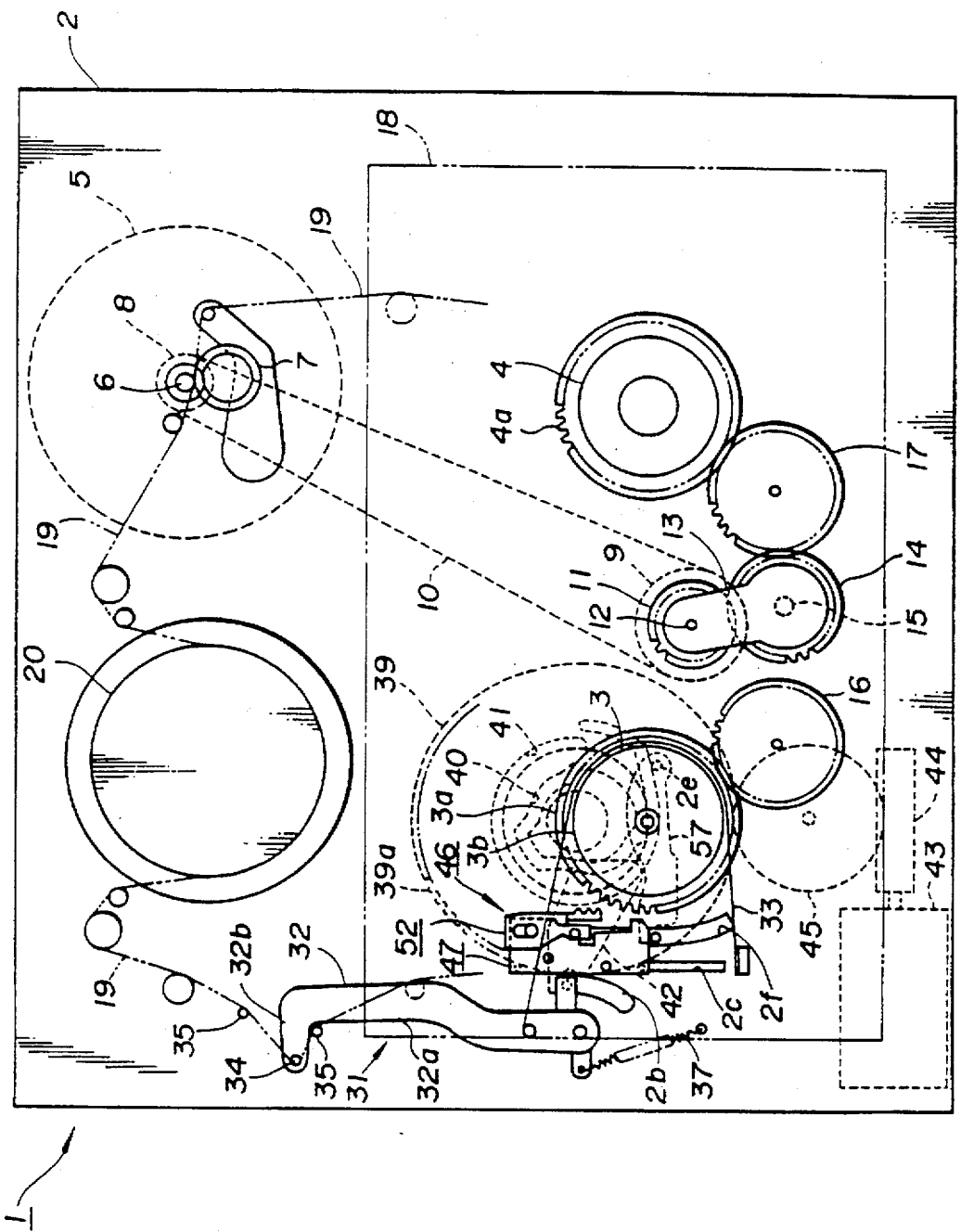
FIG. 10 is a schematic plan view of a recording and/or reproducing apparatus, on which a tension regulating mechanism and a compulsorily rotating mechanism are mounted, according to the present invention.
Figure 11:
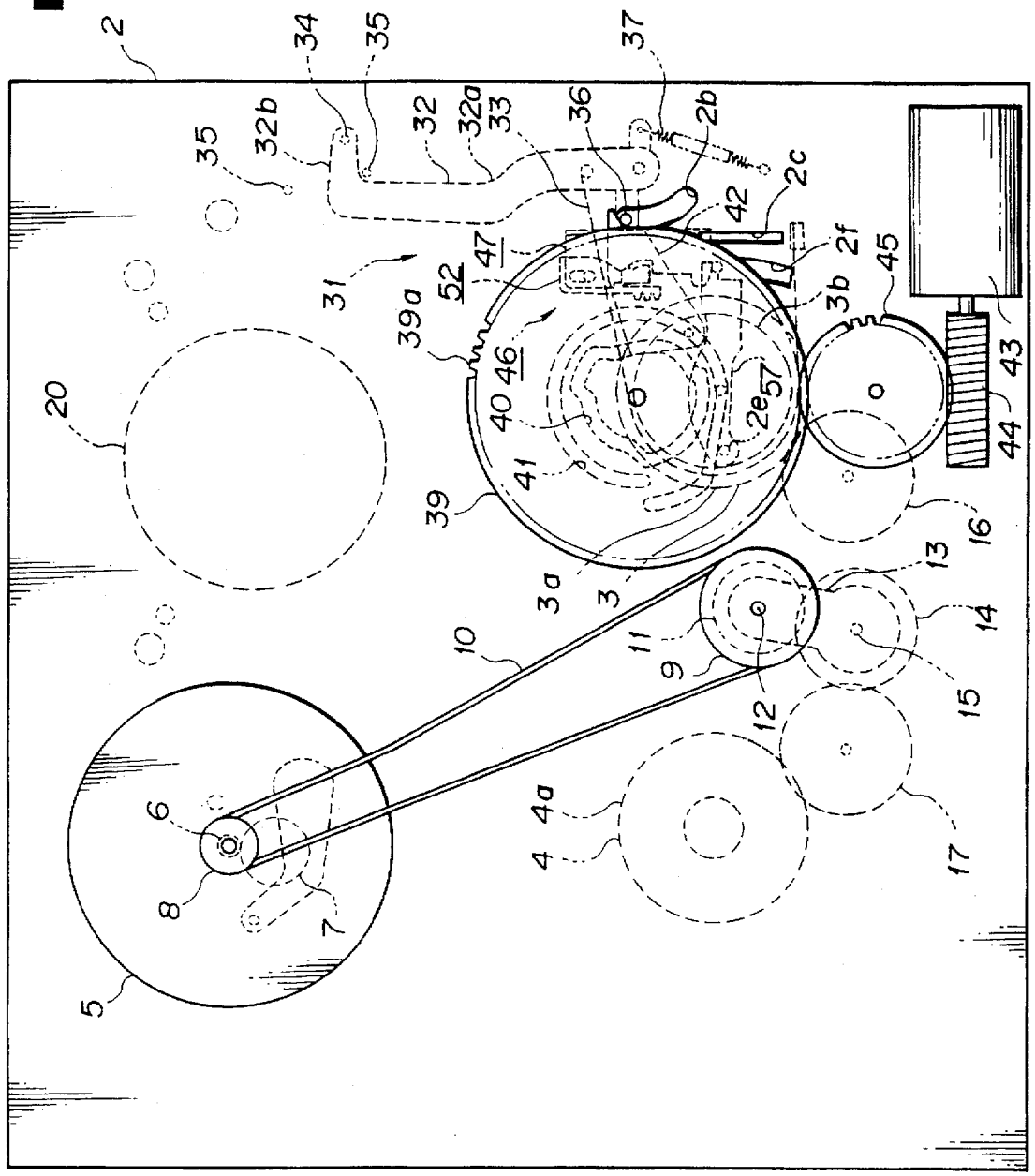
FIG. 11 is a bottom view of the recording and/or reproducing apparatus of FIG. 10.
Figure 12:
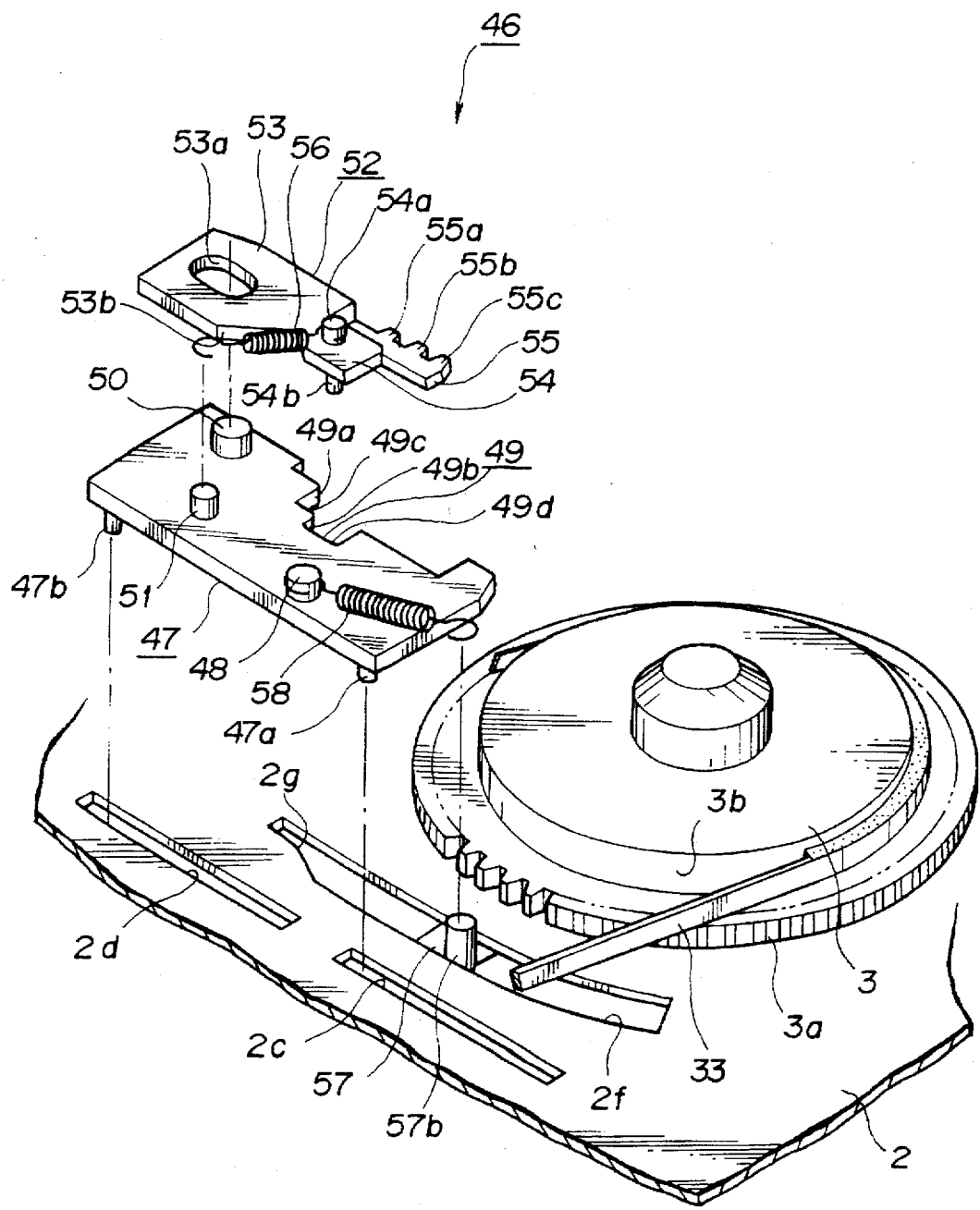
FIG. 12 is an exploded, perspective view of the main portion of the compulsorily rotating mechanism of FIG. 10.

Schematic Construction of Recording and/or Reproducing Apparatus (FIGS. 1 to 3)

Referring now to the drawings, particularly to FIGS. 1 to 3, a recording and/or reproducing apparatus 1, such as a video tape recorder, includes an essentially rectangular mechanical chassis 2. A pair of reel tables, i.e. supply and take-up reel tables 3 and 4 are arranged on the upper surface of the mechanical chassis 2 at locations other than the center thereof so as to be separated from each other by a predetermined distance. The supply and take-up reel tables 3 and 4 are rotatably supported on the mechanical chassis 2, and have reel gears 3a and 4a, respectively.

A capstan motor 5 is mounted on the lower surface of the mechanical chassis 2 at a location behind of the take-up reel table 4. The axle 6 for supplying output of the capstan motor 5 which will be referred to as a "capstan axle" passes through an opening formed in the mechanical chassis 2 so as to project upwards from the upper surface thereof.

A pinch roller 7 is rotatably mounted on the upper surface of the mechanical chassis 2 and so arranged as to face the capstan axle 6. The pinch roller 7 is designed to thrust against the capstan axle 6 in order to cause a magnetic tape to travel when the recording and/or reproducing apparatus 1 operates in a reproducing mode in which picture signals are reproduced.

As can be seen clearly from FIG. 2, a driving pulley 8 is arranged on the lower surface of the mechanical chassis 2 and fixed to the capstan axle 6 so as to rotate depending upon the rotation of the capstan axle 6. In addition, a driven pulley 9 is also arranged on the lower surface of the mechanical chassis at an essentially intermediate location between the supply and take-up reel tables 3 and 4, and is rotatably supported on the mechanical chassis 2. The height of the driven pulley 9 is essentially same as that of the driving pulley 8. The rotation force of the driving pulley 8 is transmitted to the driven pulley 9 via a belt 10.

A driven gear 11 is arranged on the upper surface of the mechanical chassis 2 and is in communication with the driven pulley 9 via a rotating axle 12 which passes through an opening formed in the mechanical chassis 2 to extend vertically. The driven gear 11 is provided with a torque limiter (not shown) therein, so as to rotate together with the driven pulley 9 at a small load.

An oscillating lever 13 is also arranged on the upper surface of the mechanical chassis 2 and is rotatably supported on the common rotating axle 12 of the driven pulley 9 and the driven gear 11. The oscillating end of the oscillating lever 13 rotatably supports a pendulum or swing gear 14 which engages the driven gear 11. That is, a supporting axle 15 extends downwards from the oscillating end of the oscillating lever 13, and the pendulum gear 14 is rotatably supported on the supporting axle 15. The lower end of the supporting axle 15 passes through an essentially sector-shaped through opening 2a formed in the mechanical chassis 2 at an intermediate location between the reel tables 3 and 4, and projects on the lower side of the mechanical chassis 2.

The reel gears 3a and 4a of the respective reel tables 3 and 4 respectively engage idler gears 16 and 17 which are rotatably supported on the upper surface of the mechanical chassis 2. The pendulum gear 14 can move between the idler gears 16 and 17 to engage one of the idler gears 16 and 17. When the pendulum gear 14 is positioned at an essentially intermediate location between the idler gears 16 and 17, the pendulum gear 14 is designed to not engage either of the idler gears 16 or 17.

Furthermore, the size of the through opening 2a is designed so that the lower end of the supporting axle 15 comes into contact with the inner edge of the through opening 2a when the oscillating lever 13 is moved and the pendulum gear 14 engages either idler gear 16 or 17.

When a magnetic tape cassette 18 is loaded in the recording and/or reproducing apparatus 1 at a predetermined position, magnetic tape 19 housed within the tape cassette 18 is drawn out and wound onto a rotary head drum 20 at a predetermined inclined angle. The magnetic tape 19 is guided by various tape guides so as to form a tape path.

Switching Mechanism (FIGS. 4 to 9)

The recording and/or reproducing apparatus 1 is also provided with a switching mechanism 21 for forcing the pendulum gear 14 to oscillate. As can be seen clearly from FIG. 4, the switching mechanism 21 essentially comprises a motor 22, a cam gear 23, a worm gear 25, an oscillating link 26 and a sliding member 29.

The motor 22 is designed to drive the cam gear 23 and serves as a mode selecting motor. The mode selecting motor 22 is mounted on the lower surface of the mechanical chassis 2 near a location beneath the take-up reel table 4.

The cam gear 23 comprises a spur gear, one surface of which is formed with a cam groove 24. The cam gear 23 is rotatably supported on the lower surface of the mechanical chassis 2 so that the cam groove 24 faces the lower surface of the mechanical chassis 2. The cam gear 23 engages a worm gear 25 which is supported on the output axle of the mode selecting motor 22.

The oscillating link 26 has an essentially L-shape structure which comprises a shorter arm 27 and a longer arm 28. The bent portion of the oscillating link 26 is rotatably supported on the lower surface of the mechanical chassis 2 at a location neighboring the cam gear 23 so that the oscillating link 26 can oscillate along the lower surface of the mechanical chassis 2. The shorter arm 27 of the oscillating link 26 extends from the oscillating axis in a right-rearward direction so that the end thereof is arranged between the cam gear 23 and the mechanical chassis 2. The longer arm 28 extends from the oscillating axis in a forward direction.

The end of the shorter arm 27 of the oscillating link 26 is integrally formed with a pin 27a which projects downwards and engages the cam groove 24 of the cam gear 23. On the other hand, the end of the longer arm 28 is integrally formed with a connecting pin 28a which projects downwards and engages the sliding member 29 which will be described hereinafter.

When the cam gear 23 rotates by means of the mode selecting motor 22, the pin 27a of the shorter arm 27 of the oscillating link 26 moves along the cam groove 24, so that the connecting pin 28a of the longer arm 28 oscillates in an essentially lateral direction.

The sliding member 29 is made of a synthetic resin, and is supported on the lower surface of the mechanical chassis 2 at a location neighboring the front edge thereof so as to be slidable in an essentially lateral direction. One end of the sliding member 29 is formed with a slightly elongated opening 29a. The connecting pin 28a of the longer arm 28 of the oscillating link 26 slidably engages the opening 29a. The other end of the sliding member 29 extends toward the through opening 2a, and is integrally formed with a pair of thrusting pieces 30R and 30L which project rearwards. The distance between the thrusting pieces 30R and 30L is slightly less than the width of the through opening 2a.

When the oscillating link 26 oscillates by means of the mode selecting motor 22, the sliding member 29 slides laterally between a left position in which the lower end of the supporting axle 15 of the pendulum gear 14 is urged toward the left edge of the through opening 2a by the right thrusting piece 30R so that the pendulum gear 14 engages the idler gear 16, and a right position in which the lower end of the supporting axle 15 is urged toward the right edge of the through opening 2a by the left thrusting piece 30L so that the pendulum gear 14 engages the idler gear 17.

As mentioned above, the sliding member 29 is made of a synthetic resin so that the thrusting pieces 30L and 30R are resilient. Therefore, if the stroke of the sliding member 29 becomes slightly enlarged, the thrusting pieces 30L and 30R will still suitably thrust against the supporting axle 15 of the pendulum gear 14. By this construction, the dimensional tolerances of respective parts may be relatively large.

The mode switching operation between the forward and reverse reproduction modes is described below.

First, in the forward reproduction modes the capstan motor 5 rotates counterclockwise, so that magnetic tape 19 which has been drawn out of the cassette is fed toward the take-up reel table 4 while it is urged by the capstan axle 6 and the pinch roller 7. At this time, the driven gear 11 also rotates counterclockwise, and the oscillating lever 13 moves toward the take-up reel table 4 so that the pendulum gear 14 engages the idler gear 17. As a result, the take-up reel table 4 is caused to rotate clockwise, so that the magnetic tape 19 guided by the capstan axle 6 and the pinch roller 7 is wound onto the take-up reel table 4.

In the forward reproduction mode, the thrusting pieces 30L and 30R of the sliding member 29 are essentially centered so that the supporting axle 15 of the pendulum gear 14 comes into contact with neither thrusting piece 30L nor 30R, i.e. the supporting axle 15 is not urged by the thrusting pieces 30L or 30R. Therefore, the oscillating lever 13 oscillates dependent only upon the rotation of the driven gear 11, and moves in the direction of rotation of the driven gear 11.

Next, when the operation mode of the recording and/or reproducing apparatus is switched to the reverse reproduction mode, the capstan motor 5 is stopped while the mode selecting motor 22 causes the sliding member 29 to move towards the left position so that the pendulum gear 14 is compulsorily, or by force, caused to engage the idler gear 16. Then, the capstan motor 5 is caused to rotate in a reverse direction, i.e. clockwise, so that the magnetic tape 19 is fed to the supply reel table 3 by means of the capstan axle 6 and the pinch roller 7. At this time, rotation force of the capstan axle 6 is transmitted to the supply reel table 3 via the driven gear 11, the pendulum gear 14, the idler gear 16 and the supply reel gear 3a, so that the supply reel table 3 rotates clockwise, and thereby magnetic tape 19 is wound onto the supply reel table 3.

In addition, after the oscillating operation of the oscillating lever 13, which compulsorily causes the pendulum gear 14 to engage the idler gear 16, is completed, the mode selecting motor 22 is designed to rotate reversely so that the sliding member 29 returns to the central position thereof.

At a time when the operation mode is switched from the forward reproduction mode to the reverse reproduction mode, the pinch roller 7 remains thrust against the capstan axle 6 via the magnetic tape 19. In this state, the capstan motor 5 is designed to stop rotation for a period of time required for the completion of the oscillating operation of the oscillating lever 13, which compulsorily causes the pendulum gear 14 to engage the idler gear 16 by means of the sliding member 19, so as to prevent slack from forming in the magnetic tape, after which operation the capstan axle 6 via the capstan motor 5 rotates in the reverse direction.

The mode switching operation between the forward and reverse reproduction modes is performed, for example, by means of a play button, a reverse button and a JOG/SHUTTLE control.

As mentioned above, the recording and/or reproducing apparatus, according to the present invention, includes one motor which causes the capstan axle to rotate as well as causing either the supply reel table or the take-up reel table to selectively rotate via the pendulum gear, and another motor for driving the switching mechanism which causes the pendulum gear to compulsorily engage either the supply reel gear or the take-up reel gear. In addition, when the operation mode is switched from the forward reproduction mode to the reverse reproduction mode, and vice versa, the recording and/or reproducing apparatus retains the pinch roller thrusting against the capstan axle, and causes the oscillating operation of the pendulum gear to be compulsorily performed by means of the switching mechanism while the capstan axle does not rotate.

Therefore, the recording and/or reproducing apparatus, according to the present invention, may prevent magnetic tape from being fed by means of the capstan axle before the supply reel table or the take-up reel table starts to rotate to wind the magnetic tape thereon, since, when the operation mode is switched from the forward reproduction mode to the reverse reproduction mode, and vice versa, the pinch roller remains thrust against the capstan axle, and the capstan motor does not rotate. As a result, the tape along the tape traveling path is prevented from becoming slack or loosened during mode switching operations, and the position of the magnetic tape on the rotary head drum is prevented from shifting. Accordingly, the operation mode may rapidly switched without tape drop-out, jitter or picture noise, and the so-called JOG/SHUTTLE function may be accomplished.

Tension Regulating Mechanism (FIGS. 10 to 12 and 13(A) to 13(E))

The recording and/or reproducing apparatus also includes a tension regulating mechanism 31 for keeping the tension of the magnetic tape 19 constant in the tape traveling path. The tension regulating mechanism 31 comprises an essentially L-shaped tension regulator arm 32 and a brake belt 33 wound onto a brake drum 3b of the supply reel table 3.

The end of the longer arm portion 32a of the tension regulating arm 32 is pivotably supported on the mechanical chassis 2 on the left of the supply reel table 3. The end of the shorter arm portion 32b thereof is provided with a tension regulating pin 34 which extends upwards. When the tension regulating arm 32 rotates counterclockwise, the tension regulating pin 34 is designed to pass through and be positioned on the left of a line drawn between a pair of guide pins 35 which are arranged on the left of the rotary head drum 20 and extend upwards. In this case, the magnetic tape 19 is bent by means of the tension regulating pin 34 and guide pins 35 so as to be essentially L-shaped. In addition, the tension regulating pin 34 is designed to move according to changes in the tension of the magnetic tape 19. In this way, the tension regulating mechanism 31 serves to keep the tension on the magnetic tape 19 constant.

As can be seen clearly from FIGS. 13(A) to 13(E), the tension regulating arm 32 is caused to pivot clockwise by means of a pushed pin 36 thrust by an oscillating lever 42 which will be described hereinafter. The pushed pin 36 extends downwards from the lower surface of the end of an arm piece 32c which extends toward the right from a location neighboring the pivotal axis of the tension regulating arm 32. The pushed pin 36 passes through an elongated through opening 2b, which is formed in the mechanical chassis 2 and extends in an essentially forward and rearward direction, and projects downwards from the lower surface of the mechanical chassis 2.

One end of the brake belt 33 is fixed to the mechanical chassis 2 before the pivotal axis of the tension regulating arm 32, and the other end thereof is fixed to the tension regulating arm 22 slightly behind the pivotal axis thereof. In addition, the intermediate portion of the brake belt 33 is wound onto the brake drum 3b of the supply reel table 3.

Furthermore, a high friction coefficient material is attached on the brake belt 33 at a portion in which the brake belt 33 is designed to come into contact with the brake drum 3b of the supply reel table 3.

The tension regulating arm 32 is biased to pivot counterclockwise by means of a coil spring 37. One end of the coil spring 37 is connected to a spring supporting piece 32d which extends toward the left from a location slightly behind the pivotal axis of the tension regulating arm 32. The other end of the coil spring 37 is connected to a spring supporting piece 38 which extends upwards from the upper surface of the mechanical chassis 2 before the pivotal axis of the tension regulating arm 32. In addition, the coil spring 37 is cooperated with the brake belt 33 to prevent the supply reel table from rotating, since there is frictional force between the brake belt 33 and the brake drum 3b.

When the tension applied to the magnetic tape 19 is relatively high, the tension regulating arm 32 pivots clockwise against the spring force of the coil spring 37 due to tension thereon, so as to reduce the angle of bend of the magnetic tape 19 between the guide pins 35, thereby decreasing the tension applied to the magnetic tape 19. On the other hand, when the tension applied on the magnetic tape 19 is relatively low, the tension regulating arm 32 pivots counterclockwise due to the spring force of the coil spring 37, so as to increase the angle of bend of the magnetic tape 19 between the guide pins 35, thereby increasing the tension applied to the magnetic tape 19.

A cam gear 39 comprised of a spur gear is rotatably supported on the lower surface of the mechanical chassis 2. One surface of the cam gear 39 is formed with two cam grooves 40 and 41 therein. The cam gear 39 is arranged on the lower surface of the mechanical chassis 2 essentially beneath the supply reel table 3 so that the cam grooves 40 and 41 face the lower surface of the mechanical chassis 2. As will be described hereinafter, the cam gear serves to control the operations of the tension regulating mechanism 31 and a compulsorily rotating mechanism which will be described hereinafter.

The tension regulating arm 32 is caused to pivot clockwise by means of an essentially rectangular oscillating lever 42 which is controlled by the cam gear 39. The great part of the oscillating lever 42 is arranged between the cam gear 39 and the mechanical chassis 2. The front-Light corner portion 42a of the oscillating lever 42 is pivotably supported on the mechanical chassis 2, and the rear-right corner thereof is integrally formed with an engaging pin 42b which extends downwards and slidably engages the cam groove 40 arranged inside the cam groove 41. In addition, the front-left end of the oscillating lever 42, i.e. the portion protruding from the periphery of the cam gear 39, is formed with a cut-out. This cut-out has a thrusting surface 42c facing the pushed pin 36 of the tension regulating arm 32, which passes through the elongated through opening 2b of the mechanical chassis 2 and projects downwards from the lower surface of the mechanical chassis 2.

A mode selecting motor 43 is supported on the lower surface of the mechanical chassis 2 at a location neighboring the front-left corner thereof. The output axle of the mode selecting motor 43 is connected to a worm gear 44. The worm gear 44 engages an intermediate gear 45 which engages a gear portion 39a formed on the periphery of the cam gear 39, so that the rotation force of the mode selecting motor 43 is transmitted to the cam gear 39.

Compulsorily Rotating Mechanism (FIGS. 10 to 12 and 13(A) to 13(E))

According to the preferred embodiment of the invention, the recording and/or reproducing apparatus includes a compulsorily rotating mechanism 46 which forces the supply reel table 3 to rotate in a direction in which the magnetic tape 19 is wound onto the supply reel table 3. As can be seen clearly from FIG. 12, the compulsorily rotating mechanism 46 comprises a sliding plate 47 which is supported on the mechanical chassis 2 so as to be slidable in forward and rearward directions, a rack plate 52 which is supported on the sliding plate 47 and is engageable with the reel gear 3a of the supply reel table 3, and an oscillating arm 57 which causes the sliding plate 47 to slide.

Sliding Plate (FIGS. 10 to 12 and 13(A) to 13(E))

The sliding plate 47 is an essentially rectangular plate which extends in forward and rearward directions, and is arranged on the left of the supply reel table 3. The sliding plate 47 is formed with two engaging pins 47a and 47b which extend downwards from the lower surface of the sliding plate 47. The engaging pins 47a and 47b are respectively arranged at locations neighboring the front-left and rear-left corners of the sliding plate 47. The engaging pins 47a and 47b engage two elongated through openings 2c and 2d which are formed in the mechanical chassis 2 on the left of the supply reel table 3, and extend in forward and rearward directions, so that the sliding plate 47 may slide in forward and rearward directions.

The sliding plate 47 is formed with a spring supporting pin 48 which projects upwards from the upper surface of the sliding plate 47 at a location neighboring the center of the left edge thereof. As will be described hereinafter, the spring supporting pin 48 supports one end of a coil spring 58, the other end of which is supported on the oscillating arm 57.

The sliding plate 47 is also formed with a cam cut-out 49 at a location neighboring the center of the right edge thereof. The rear portion of the cam cut-out 49 is formed with steps which comprise a first stopper surface 49a facing forward, a second stopper surface 49b facing forward before the first stopper surface 49a, a first position regulating surface 49c arranged between the first and second stopper surfaces 49a and 49b, and a second position regulating surface 49d extending forward from the second stopper surface.

The sliding plate 47 is also formed with a supporting pin 50 which projects upwards from the upper surface of the sliding plate 47 behind the cam cut-out 49 and near the right edge thereof. As will be described hereinafter, the supporting pin 50 serves to support the rack plate 52.

In addition, the sliding plate 47 is formed with a spring supporting pin 51 which projects upwards from the upper surface of the sliding plate 47 on the left and behind the cam cut-out 49. As will be described hereinafter, the spring supporting pin 48 supports one end of a coil spring 56, the other end of which is connected to the rack plate 52.

The respectively engaging pins 47a and 47b of the sliding plate 47 engage the corresponding elongated through openings 2c and 2d, and the sliding plate 47 is designed to be slidable between a rearward position in which the engaging pins 47a and 47b are respectively in contact with the corresponding rear edges of the through openings 2c and 2d, and a forward position in which they are respectively in contact with the corresponding front edges thereof. The rearward and forward positions will be respectively referred to an "initial position" and a "forced position".

Rack plate (FIGS. 10 to 12 and 13(A) to 13(E))

The rack plate 52 comprises an essentially rectangular rack body 53, a tongue member 54 projecting forward essentially from a of the front edge of the rack body 53, and a rack portion 55 projecting forward from the right-lower portion of the front edge of the rack body 53.

The rack body 53 is formed with a slightly elongated through opening 53a which extends longitudinally in forward and rearward directions at a location neighboring the rear edge of the rack body 53. The left portion of the front edge of the rack body 53 is formed as an angled surface 53b.

The tongue member 54 is formed with a spring supporting pin 54a and a pin 54b, which respectively project upward and downward from the upper and lower surfaces of the tongue member 54 at essentially the center thereof.

The rack portion 55 is formed with three rack teeth 55a, 55b and 55c on the right edge thereof. The rack teeth 55a, 55b and 55c are so formed to have the same pitch as that of the reel gear 3a of the supply reel table 3. The depths of these teeth are designed to increase in order from the rear tooth 55a (shallowest), to the intermediate tooth 55b and the front tooth 55c (deepest).

Furthermore, the rack teeth 55a, 55b and 55c of the rack portion 55 are designed to be arranged at the same height as that of the reel gear 3a of the supply reel table 3.

The engaging pin 50 engages the elongated through opening 53a of the rack body 53 so that the rack plate 52 is supported on the sliding plate 47 so as to slide in forward and rearward directions. In addition, a coil spring 56 is supported between the spring supporting pin 54a of the tongue member 54 and the spring supporting pin 51 of the sliding member 47 so as to be drawn slightly longer than the natural length thereof. The pin 54b of the tongue member 54 is arranged within the cam cut-out 49 of the sliding plate 47.

When the rack plate 52 is arranged at the rearmost position within its movable range relative the sliding plate 47, the pin 54b is so arranged as to come into contact with the first stopper surface 49a and the first position regulating surface 49c of the cam cut-out 49. This position will be hereinafter referred to as an "engaging position". When the rack plate 52 is arranged at the frontmost position within its movable range relative to the sliding plate 47, the pin 54b is so arranged as to come into contact with the second stopper surface 49b and the second position regulating surface 49d of the cam cut-out 49. This position will hereinafter be referred to as a "disengaging position". The coil spring 56 serves as a click stop mechanism for the rack plate 52 while it moves between the engaging and disengaging positions.

The height of the pin 54b of the rack plate 52 is greater than the thickness of the sliding plate 47, so that the end portion of the pin 54b is designed to be arranged in an essentially arc-shaped, elongated through opening 2f formed in the mechanical chassis 2 at a location neighboring the elongated through openings 2c and 2d of the mechanical chassis.

As will be described hereinafter, in a case where the rack plate 52 is in the engaging position, the rack teeth 55a, 55b and 55c are designed to engage the reel gear 3a of the supply reel table 3 when the sliding plate 47 moves forward relative to the mechanical chassis 2.

The sliding plate 47 is caused to move in forward and rearward directions by means of an elongated oscillating arm 57 which is controlled by the cam gear 39. The oscillating arm 57 is arranged between the cam gear 39 and the mechanical chassis 2. The right end of the oscillating arm 57 is pivotably supported on the mechanical chassis 2 by means of a supporting pin 2e. The oscillating arm 57 is integrally formed with an engaging pin 57a which projects downwardly at a location between the center and the pivotal axis of the oscillating arm 57. In addition, the oscillating arm 57 is integrally formed with a spring supporting pin 57b which projects upwardly at the left end thereof so as to pass through the essentially arc-shaped through an opening 2f to protrude from the mechanical chassis 2.

The engaging pin 57a of the oscillating arm 57 engages the outer cam groove 41 of the cam gear 39 so as to be slidable therein. In addition, a coil spring 58 is so supported between the spring supporting pin 57b and the spring supporting pin 48 of the sliding plate 47 as to be slightly drawn longer than the natural length thereof.

The essentially arc-shaped through opening 2f of the mechanical chassis 2 is relatively wide and extends in essentially forward and rearward directions, and has at the rear end thereof a narrowed portion 2g having essentially half the width of the greater part of the through opening 2f.

As will be described hereinafter, when the oscillating arm 57 is so controlled by means of the cam gear 39 as to rotate counterclockwise, the oscillating arm 57 forces the sliding plate 47 to move from the initial position to the forced position, via the coil spring 58, so that the rack teeth 55a, 55b and 55c of the rack portion 55 of the rack plate 52 mounted on the sliding plate 47 engages the reel gear 3a of the supply reel table 3 in order of rack tooth 55c, followed by 55b and finally 55a, thereby forcing the supply reel table 3 to rotate counterclockwise.

Then, when the sliding plate 47 is positioned at the forced position, it is stopped so that the rack teeth 55a, 55b and 55c of the rack portion 55 of the rack plate 52 remain engaging the reel gear 3a of the supply reel table 3.

Thereafter, when the supply reel table 3 is caused to rotate counterclockwise by means of the capstan motor 5, the rack teeth 55a, 55b and 55c of the rack plate 52 are thrust in a forward direction due to the rotation of the reel gear 3a of the supply reel table 3, so that the rack plate 52 moves forwards since the rack plate 52 is slidably supported on the supporting pin 50 of the sliding plate 47. At this time, the pin 54b of the tongue member 54 moves first along the first position regulating surface 49c, and then along the second stopper surface 49b due to the spring force of the coil spring 56, so that the rack plate 52 is caused to move clockwise. When the pin 54b of the tongue member 54 reaches the second position regulating surface 49d, clockwise movement of the rack plate 52 is stopped. In this way, the rack teeth 55a, 55b and 55c of the rack plate 52 are caused to disengage from the reel gear 3a of the supply reel table 3, and the rack plate 52 reaches the disengaging position.

When the oscillating arm 57 is caused to rotate clockwise, the sliding plate 47 is thrust rearwards by means of the spring supporting pin 57b so as to move from the forced position to the initial position. Immediately before the sliding plate 47 returns to the initial position, the pin 54b of the rack plate 52 moves along the narrowed portion 2g of the elongated through opening 2f of the mechanical chassis 2, so as to move to the right. In this way, the rack plate 52 returns to the engaging position in the reverse of the motion in which it moves from the engaging position to the disengaging position.

Operation Timing between Tension Regulating Mechanism and Compulsorily Rotating Mechanism (FIGS. 13(A) to 13(E))

In a case where the operation mode of the recording and/or reproducing apparatus is switched from the forward reproduction mode to the reverse reproduction mode, three operations, i.e. removal of applied tension from the magnetic tape 19 by means of the tension regulating mechanism 31, releasing of the brake preventing the supply reel table 3 from rotating and, the rotating of the supply reel table 3 in a direction in which the magnetic tape 19 is wound onto the supply reel table 3 by means of the compulsorily rotating mechanism, are performed, slightly before the capstan motor 5 begins reverse rotation.

The tension regulating mechanism 31 and the compulsorily rotating mechanism 46 operate synchronously, since they are respectively controlled by means of two cam grooves 40 and 41 formed in one cam gear 39.

That is, when the operation mode of the recording and/or reproducing apparatus is switched from the forward reproduction mode to the reverse reproduction mode, the capstan motor 5 is stopped as the mode selecting motor 43 is driven, so that the cam gear 39 is caused to rotate via the worm gear 44 and the intermediate gear 45, thereby causing the oscillating lever 42 and the oscillating arm 57 to rotate at a predetermined timing.

Figure 13A:
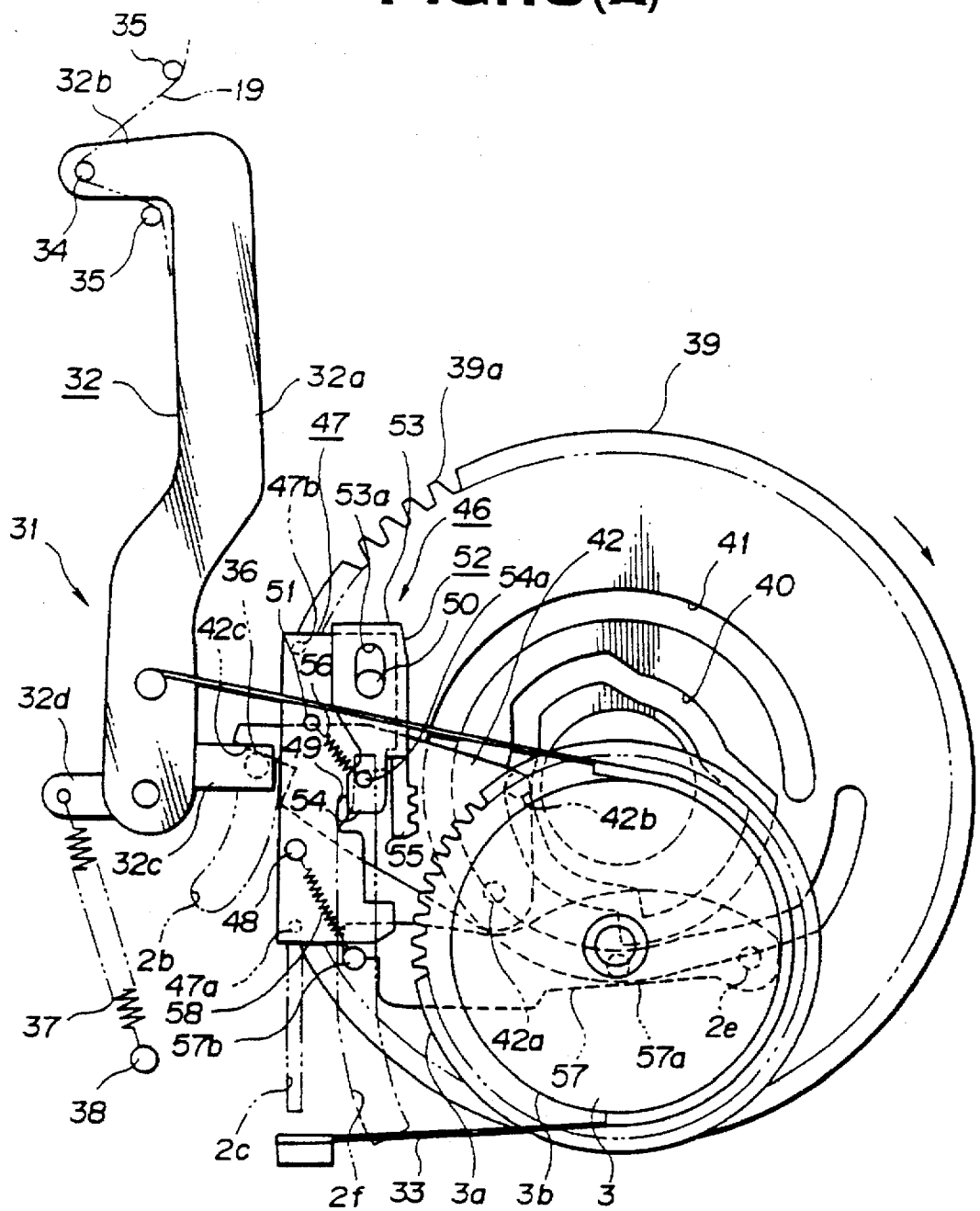
FIGS. 13(A) to 13(E) are schematic plan views of the main portion of the tension regulating mechanism and the compulsorily rotatating mechanism of FIG. 10.
Figure 13B:
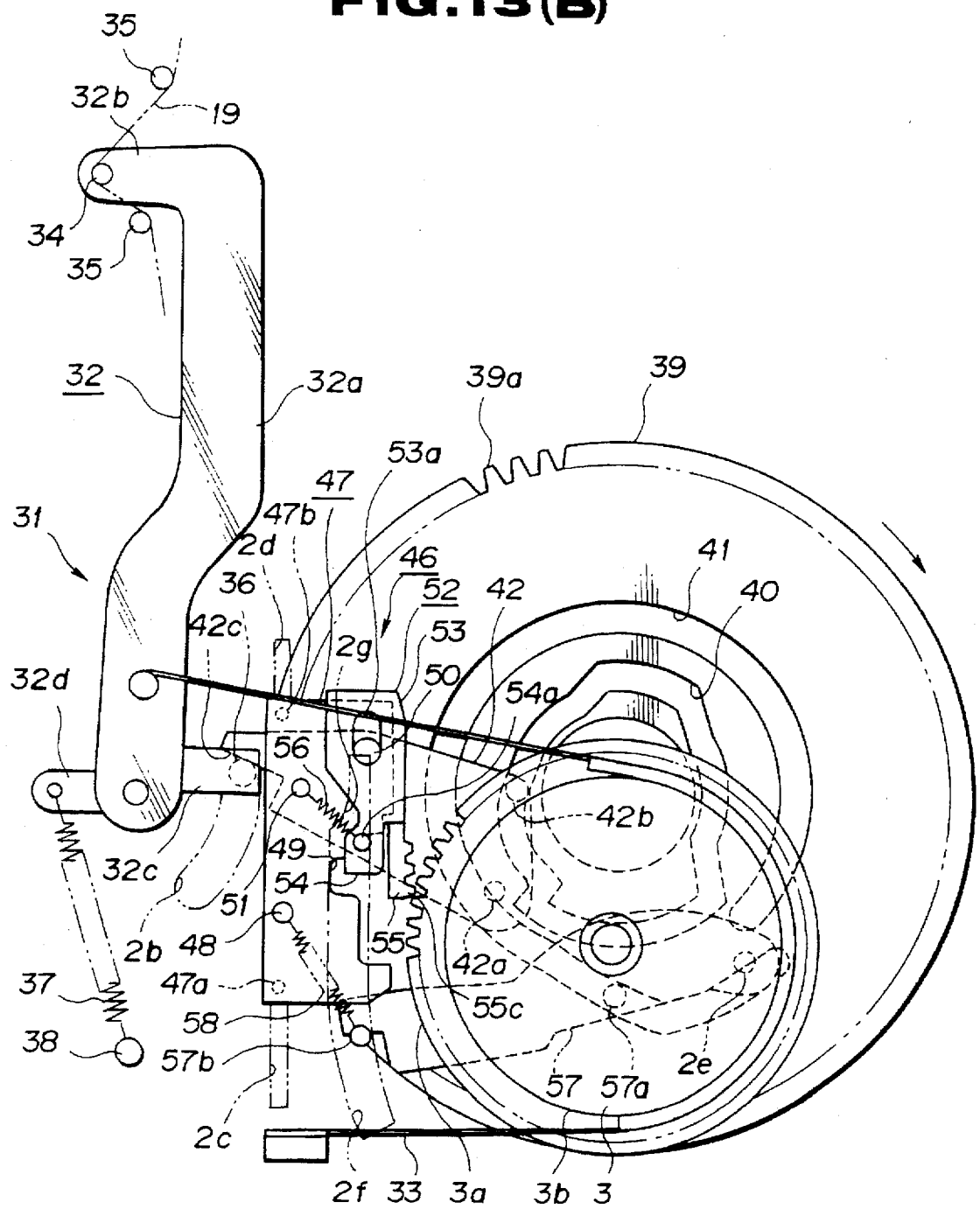

The oscillating arm 57 starts to move slightly before the oscillating lever 42 starts to move, so as to cause the sliding plate 47 to move forward from the initial position shown in FIG. 13(A).

Next, the forward rack tooth 55c of the rack portion 55 of the rack plate 52 mounted on the sliding plate 47 comes into contact with the reel gear 3a of the supply reel table 3. Then, when the oscillating arm 57 rotates slightly counterclockwise, the oscillating lever 42 starts to move, so that the tension regulating arm 32 is caused to rotate clockwises thereby reducing the tension applied to the magnetic tape 19 as well as to the brake belt 33. In this way, the operation for preventing the supply reel table 3 to rotate is gradually released.

In this state, since rotation of the supply reel table 3 is prevented by means of the brake belt 33, the sliding plate 47 remains in contact with the reel gear 3a of the supply reel table 3 and is prevented from moving forward, so that the coil spring 58 supported between the sliding plate 47 and the oscillating arm 57 is caused to extend as shown in FIG. 13 (B).

Figure 13C:
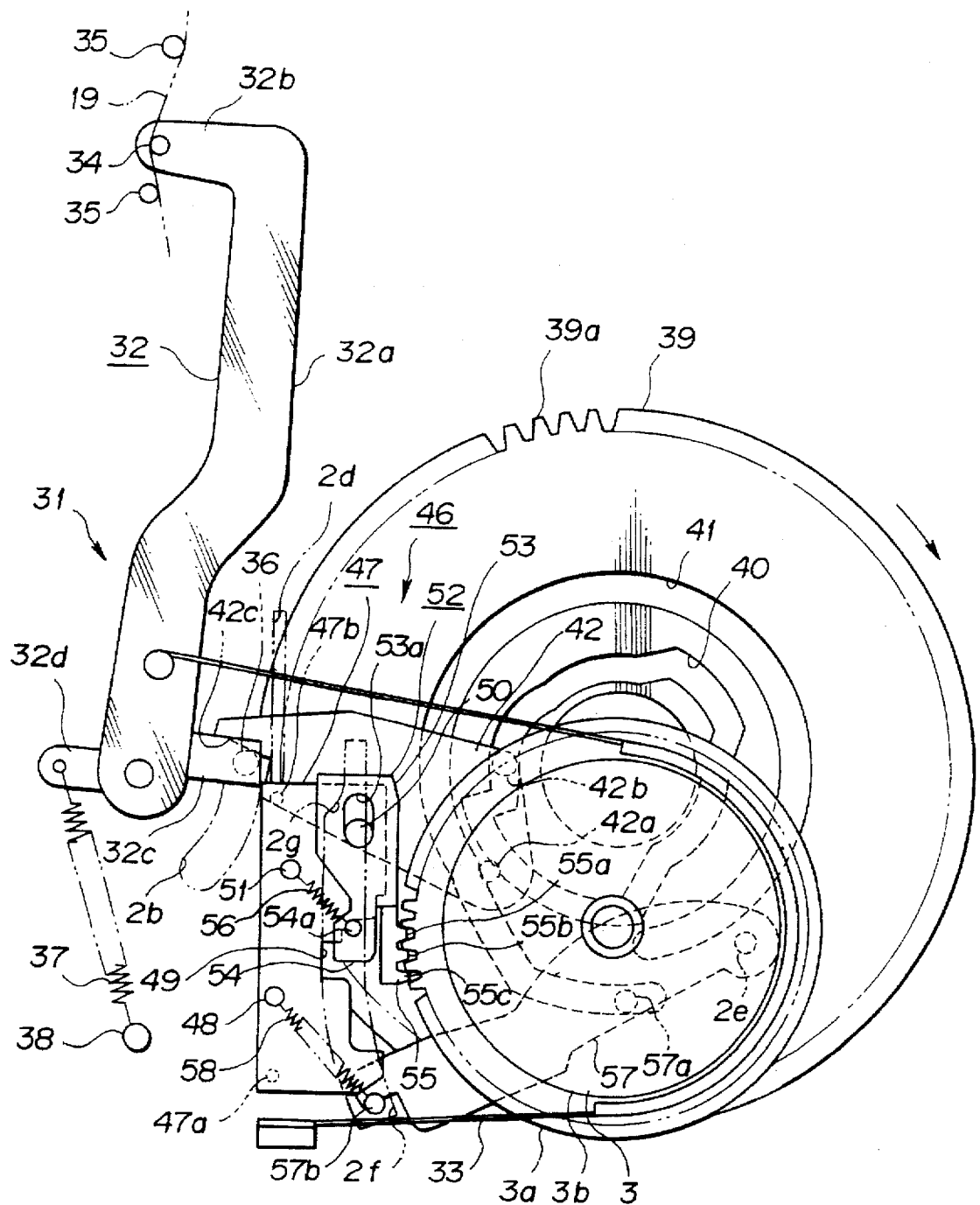

Then, when the spring force of the coil spring 58 becomes greater than the braking force of the brake belt 33 which prevents the supply reel table 3 to rotate, the supply reel table 3 is caused to rotate counterclockwise due to the engagement between the rack teeth 55a, 55b and 55c and the reel gear 3a of the supply reel table 3, and the thrusting force of the rack plate 52, as shown in FIG. 13(C).

At this time, the angle of bend in the magnetic tape 19 between the guide pins 35 along the tape traveling path decreases due to the clockwise rotation of the tension regulating arm 32, usually under this condition the magnetic tape 19 would be slacked or loosened. However, the loosening tape is swiftly wound onto the supply reel table 3 due to the counterclockwise rotation of the supply reel table 3, thus preventing the magnetic tape 19 in the tape traveling path from being loosened.

The moment the compulsory and temporary winding of the magnetic tape 19 onto the supply reel table 3, by means of the compulsorily rotating mechanism 46, is finished, the capstan motor is caused to rotate reversely. As a result, the magnetic tape 19 is fed out by means of the capstan axle 6 and the pinch roller 7 as well as the supply reel table 3, which is caused to rotate by the switching of the pendulum gear 14, so that the operation mode of the recording and/or reproducing apparatus is switched to the reverse reproduction mode.

Figure 13D:
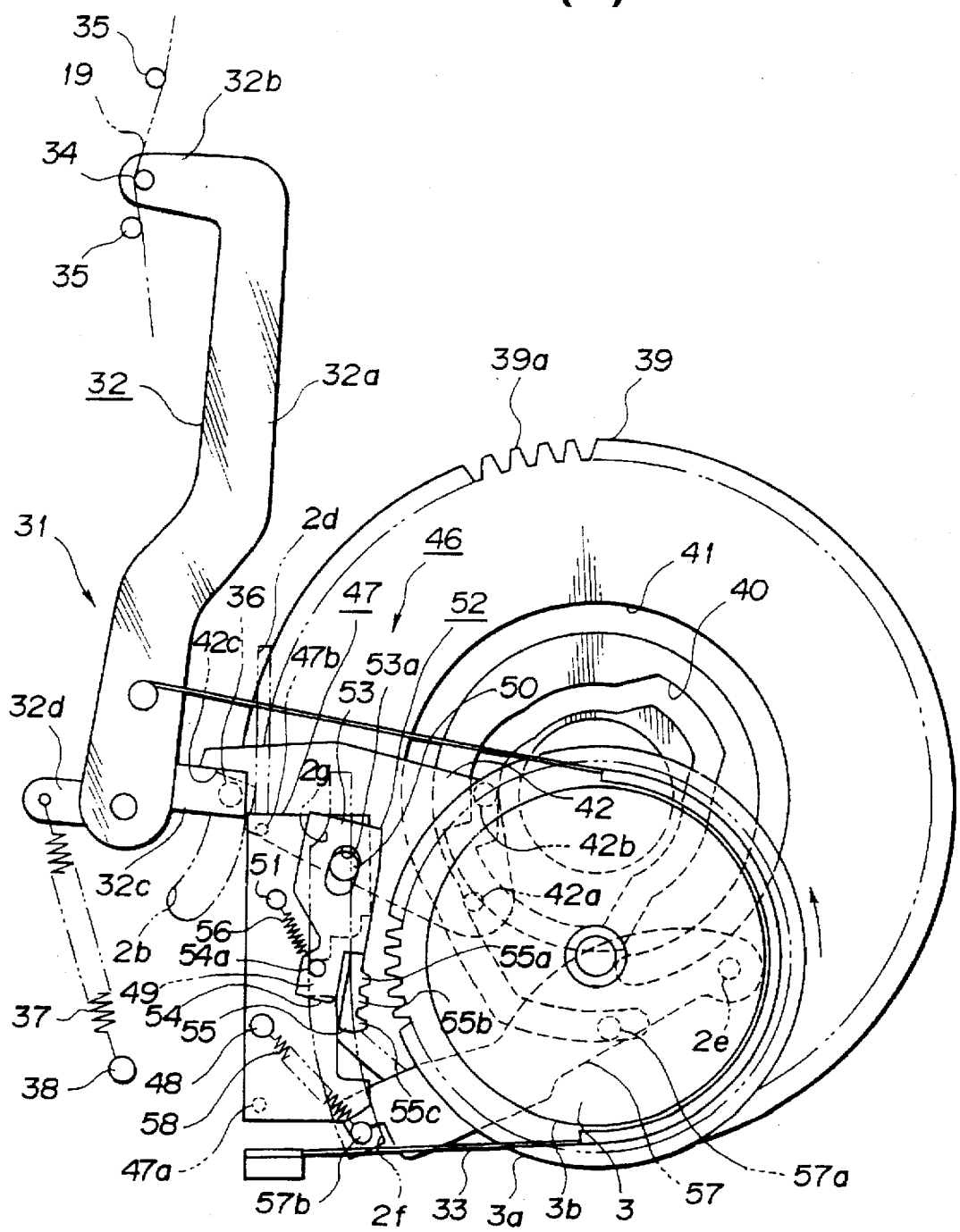

In addition, when the supply reel table 3 is caused to rotate counterclockwise by means of the capstan motor 5, the rack plate 52 is thrust to the left to move from the engaging position to the disengaging position as shown in FIG. 13(D).

Figure 13E:
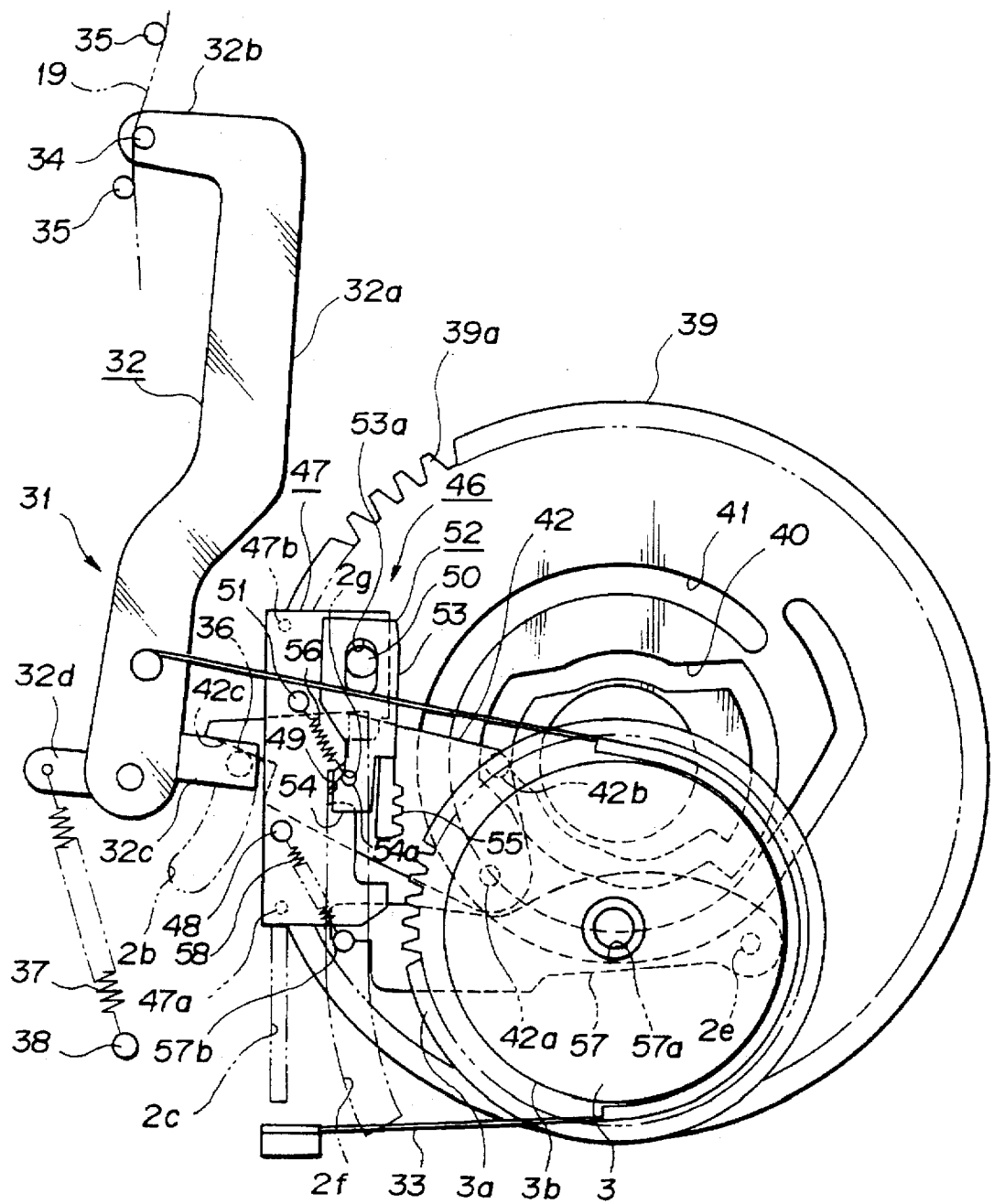

In order to return the sliding plate 47 to the initial position and to return the rack plate 52 to the engaging position, the mode selecting motor 43 causes the cam gear 39 to rotate so as to cause the oscillating arm 57 to rotate clockwise. As a result, the oscillating arm 57 thrusts the front edge of the sliding plate 47 so as to cause the sliding plate 47 to move rearwards and return to the initial position. At this time, as described above, the rack plate 52 is caused to move to the engaging position so that the pin 54b moves along the narrowed portion 2g of the elongated through opening 2f as shown in FIG. 13(E).

As mentioned above, the recording and/or reproducing apparatus, according to the present invention, may prevent looseness or slack from occurring in a magnetic tape, since the supply reel table is forced to rotate in a direction in which the magnetic tape is wound onto the supply reel table if the application of tension to the magnetic tape by means of the tension regulating mechanism is removed when the operation mode of the recording and/or reproducing apparatus is switched from the forward reproduction mode to the reverse reproduction mode. In addition, it is possible to prevent magnetic tape in contact with the rotary head drum from shifting from a predetermined desired position. Therefore, the occurrence of tape drop-out, jitter and picture noise is prevented.

Tape Guide Mechanism (FIGS. 14 to 18)

The schematic construction of the recording and/or reproducing apparatus, which is necessary for describing a tape guide mechanism of the present invention, is described below.

The rotary head drum 20 is mounted on the mechanical chassis 2 inclined at a predetermined angle. The mechanical chassis is formed with a pair of elongated through openings 60S and 60T serving as guide openings on the both sides of the rotary head drum 20. The guide openings 60S and 60T are so arranged as to extend along the rotary head drum 20, so that the rear ends thereof are arranged behind a line drawn between the right and left end of the head drum 20, and the front ends thereof are arranged before the exposed portion of the magnetic tape 19 when the tape cassette 18 is inserted into the recording and/or reproducing apparatus.

The rotary head drum 20 is formed with a step 20a on the drum surface. The magnetic tape 19 is designed to travel while the lower edge thereof comes into contact with the step 20a.

A pair of tape guide blocks 61S and 61T are designed to move along the guide openings 60S and 60T of the mechanical chassis 2 in order to perform tape loading. On the upper surfaces of the tape guide blocks 61S and 61T, vertically extending guide rollers 62S and 62T and inclined guide posts 63S and 63T are respectively mounted at locations neighboring the rear edges thereof.

The vertically extending guide rollers 62S and 62T are respectively provided with a pair of flanges 64 on the upper and lower ends thereof.

In addition, a plurality of fixed guide posts 66 project vertically from the upper surface of the mechanical chassis 2 along the tape travel path.

When the tape cassette 18 is loaded into the recording and/or reproducing apparatus 1, the tape guide blocks 61S and 61T are first arranged at respective front edges of the guide openings 60S and 60T. In this state, the vertically extending guide rollers 62S and 62T and the inclined guide posts 63S and 63T projecting from the upper surface of the tape guide blocks 61S and 61T are positioned in front of the drawing surface 18a of the tape cassette 18.

When the tape guide blocks 61S and 61T move to the positions shown in FIG. 15, the magnetic tape 19 is drawn out of the tape cassette 18 to be arranged on the tape travel path formed along the fixed left guide posts 66, the vertically extending left guide roller 62S and the inclined left guide post 63S, to the rotary head drum 20, and from the head drum 20 to the inclined right guide post 63T, the vertically extending right guide roller 62T, the fixed right guide post 66 and the capstan axle 6.

Figure 17:
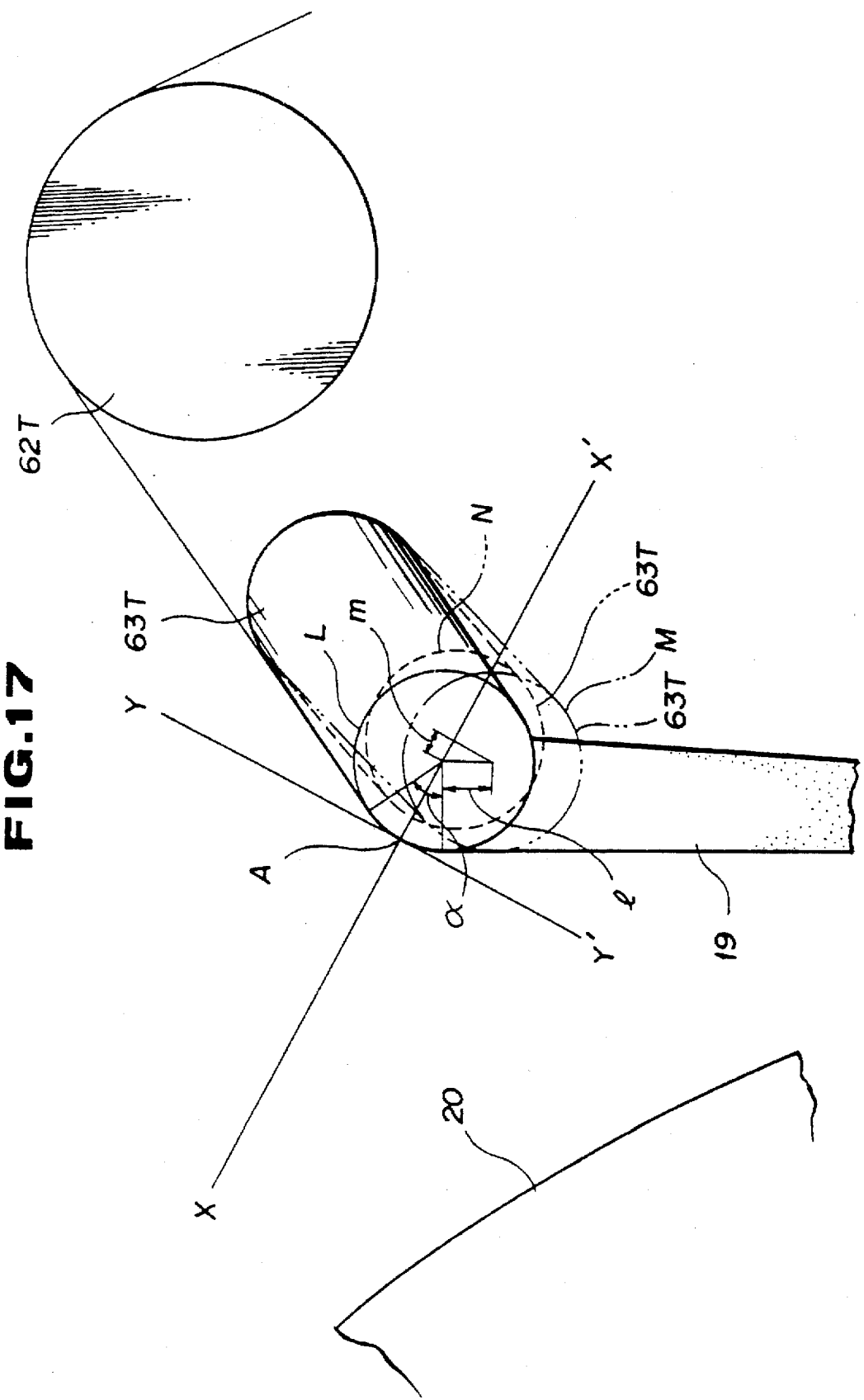
FIG. 17 is a further enlarged plan view of the main portion of the tape guide mechanism of FIG. 16.

Inclined Guide Posts (FIGS. 16 to 18)

In prior art VTR constructions, inclined guide posts are provided intermediate a rotary head drum and a tape guide roller. The degree of the inclination is based on a theoretical angle which is derived from predetermined parameters including the inclined angle of the rotary head drum relative to the mechanical chassis, the tape-wrap angle at which the magnetic tape is wound onto the rotary head drum, the inclined angle of the step formed on the rotary head drum for leading the magnetic tape, and so forth, by a predetermined equation known in the art. The inclined guide posts of conventional constructions are further inclined from this theoretical angle so as to urge the tape slightly upward as it passes over the guide post. This upward tendency is immediately reversed by the flange of the guide roller such that the tape passes stably over the guide pin. The above described construction however, has an insufficient stabilizing effect on tape travel between the upright guide roller and the inclined magnetic head drum because, from the guide pin to, and around, the rotary head drum, the tape tension of the upper longitudinal section of tape differs from the tape tension of the lower longitudinal section, therefore tape jitter commonly occurs at this point in the tape path.

According to the present invention, the inclined guide posts 63S and 63T are still further inclined from the theoretical angle in a direction parallel to the surface of magnetic tape on the side of the rotary head drum 20, such that the tape 19 passes stably over the guide posts 63S and 63T, held by the opposing pull of those inclined guide posts and the flanges 64 of the guide rollers 62S and 62T.

Additionally, however, the inclined angle of the guide pins according to the present invention also serve to equalize the tape tension along the longitudinal width of the tape 19 passing from the guide pins 63S and 63T to, and around, the rotary head drum 20, such that no tape jitter may occur.

In FIG. 17, the circle L drawn in a solid line indicates the top surface of an inclined guide post which is inclined at the theoretical inclination, the circle M drawn in a chain line indicates the inclined guide post 63S (or 63T) of the present invention, and the circle N drawn by the broken line indicates that of conventional apparatus, both of the above constructions are further inclined from the theoretical inclination so as to tend to cause the magnetic tape 19 to stably travel.

The inclined guide post 63S (or 63T), according to the present invention, is further inclined so that the top surface M thereof is shifted from the top surface L of the inclined guide post according to the theoretical inclination, by a distance ι in a direction parallel to the magnetic tape 19 on the side of the rotary head drum 3. As a result, the inclination of the invention includes an inclination constituent along the line X—X' in FIG. 17, which is perpendicular to the tangential line Y—Y' at the tape-wrap center (point A).

For example, in a case where an inclined guide post should inclined in the X—X' direction by an angle of 0°20' from the theoretical inclination in order to accomplish optimum, stable travel of magnetic tape 19, when the wrap angle α of the magnetic tape 19 relative to the inclined guide post is 55°, the shifted distance ι is subject to the following formula:

$$\sin(55°/2) = m/\iota \quad (1)$$

in which m is a shifted distance of the top surface of the inclined guide post in the line X—X' direction. The shifted distance m relates to the length of the inclined guide post 63S or 63T. For example, when the length thereof is 30 mm, the shifted distance m is subject to the following formula.

$$m = \tan(0°20' \times 30) \quad (2)$$

The aforementioned formulae (1) and (2) lead to the following formula.

$$\iota = \tan(0°20' \times 30)/\sin 27.5° = 0.3780 \text{ m/m}$$

Therefore, if the inclined guide posts 63S and 63T are further inclined from the theoretical inclination so that the top ends thereof are shifted by 0.3780 m/m in a direction parallel to the magnetic tape 19 on the side of the rotary head drum 20, the same result as if the inclined guide posts 63S and 63T were inclined further from the theoretical inclination by an angle of 0°20' in a direction of the line X—X', is obtained without the drawback of changing the tensions between the upper and lower portions of the magnetic tape 19 on the rotary head drum 20.

In the aforementioned case, since the inclined guide posts 63S and 63T are further inclined from the theoretical inclination by an angle of 0°20' in a direction of the line X—X', force for causing the magnetic tape 19 to move upwardly is applied thereon. In addition, since upper flanges 64 of the vertically extending guide rollers 62S and 62T prevent the magnetic tape 19 from moving upwardly, the vertical movement of the magnetic tape 19 is suitably regulated.

Furthermore, the heights of the vertically extending guide rollers 62S and 62T are adjustable. By adjusting these heights, the upper edge of the magnetic tape 19 may be urged downwardly by means of the upper flanges 64. To the magnetic tape 19 urged thus downwardly, an upward counter-force is applied by means of the inclined guide posts 63S and 63T, so that the magnetic tape 19 is prevented from moving in either upward or downward directions. Therefore, the magnetic tape 19 may stably travel on the rotary head drum 20 without moving in upward or downward directions while it comes into contact with the rotary head drum 20. As a result, the tensions of the upper and lower portions of the magnetic tape 19 are kept even so that occurrence of jitter is prevented.

While the present invention has been disclosed in terms of the preferred embodiment in order to facilitate better understanding of the invention, it should be appreciated that the invention can be embodied in various ways without depending from the principle of the invention. Therefore, the invention should be understood to include all possible embodiments and modification to the shown embodiments which can be embodied without departing from the principle of the invention as set out in the appended claims.

What is claimed is:

1. A system for regulating tension applied to a tape in an apparatus wherein the tape is selectively driven in one of first and second directions by a tape drive means, comprising:

tension applying means for applying tension to the tape when the tape travels in the second direction, and for releasing the application of tension to the tape when the tape travels in the first direction;

control means for controlling said tension applying means to regulate the tension applied to the tape when the tape travels in the second direction; and slack take-up means, operatively connected with said control means, for taking up slack in the tape before the drive means causes the tape to travel in the second direction, and for preventing the tape from becoming loose when the traveling direction of the tape is switched from the first direction to the second direction, wherein the apparatus has a first reel, supported by a first reel table, onto which the tape traveling in the first direction is wound, and a second reel, supported by a second reel table, onto which the tape traveling in the second direction is wound, the first and second reel tables being driven by the drive means, and wherein said slack take-up means causes the first reel table to rotate by a predetermined amount in a direction which causes a small portion of the tape to be wound onto the first reel immediately before the drive means causes the tape to travel in the second direction.

2. A system as set forth in claim 1, wherein the first reel table has a first gear portion on the periphery thereof, and said slack take-up means includes a slidable member having a second gear portion which is engageable with the first gear portion, said slidable member being movable between a first position wherein the second gear portion of said slidable member engages with the first gear portion, and a second position wherein the second gear portion disengages from the first gear portion.

3. A system as set forth in claim 2, wherein said slack take-up means includes a driving means for causing the slidable member to move between said first and second positions.

4. A system as set forth in claim 3, wherein said slidable member includes a first plate member and a second plate member, said second plate member being slidably supported on the first plate member, wherein said second gear portion of the slidable member is formed on the second plate member, wherein said slack take-up means includes a cam gear having first and second cam grooves, wherein first and second arm members respectively engage the first and second cam grooves so as to move at a predetermined timing, and wherein said first and second arm members are respectively engageable with the first and second plate members for causing the first and second plate members to move.

5. A system as set forth in claim 3, wherein said apparatus is selectively operable in a first reproduction mode in which reproduction is performed while the tape travels in the second direction, and a second reproduction mode in which reproduction is performed while the tape travels in the first direction, wherein said slack take-up means causes the first reel table to rotate in the direction in which the tape is wound onto the first reel when the operation mode of the apparatus is switched from the second reproduction mode to the first reproduction mode.

6. A system for regulating tension applied to a tape which selectively travels in one of first and second directions in a recording an/or reproducing apparatus which has:

a first reel table which supports a first reel onto which the tape, when traveling in the first direction, is wound, a second reel table which supports a second reel onto which the tape, when traveling in the second direction, is wound, and driving means for causing the tape to selectively travel in one of the first and second directions, said system comprising:

a tension control arm for applying tension to the tape when the tape is traveling in the second direction, and for releasing the application of tension to the tape when the tape is traveling in the first direction;

biasing means for biasing said tension control arm in a first tension control direction so as to cause said tension control arm to apply tension to the tape when the tape is traveling in the second direction;

braking means, responsive to the tension in the tape, for causing said tension control arm to move in a second tension control direction for regulating the tension applied to the tape when the tape is traveling in the second direction; and thrusting means for forcing the first reel table to rotate by a predetermined amount in a direction wherein the tape moves in the first direction and is wound onto the first reel and slack in the tape is taken up immediately before the driving means causes the tape to travel in the second direction, so as to prevent the tape from becoming loose when the traveling direction of the tape is switched from the first direction to the second direction.

7. A system for regulating tension applied to a tape in an apparatus wherein the tape is selectively driven in one of first and second directions by a tape drive means, comprising:

tension applying means for applying tension to the tape when the tape travels in the second direction, and for releasing the application of tension to the tape when the tape travels in the first direction;

control means for controlling said tension applying means to regulate the tension applied to the tape when the tape travels in the second direction, said control means including a cam wheel with first and second cam means, a spring biased pivotal tension control lever, which forms part of said tension applying means, operatively connected with the first cam means; and slack take-up means, operatively connected with the second cam means, for taking up slack in the tape before the drive means causes the tape to travel in the second direction, and for preventing the tape from becoming loose when the traveling direction of the tape is switched from the first direction to the second direction.

* * * * *